US009573684B2

(12) United States Patent
Kimchi et al.

(10) Patent No.: US 9,573,684 B2
(45) Date of Patent: Feb. 21, 2017

(54) UNMANNED AERIAL VEHICLE DELIVERY SYSTEM

(71) Applicant: Amazon Technologies, Inc., Seattle, WA (US)

(72) Inventors: Gur Kimchi, Bellevue, WA (US); Daniel Buchmueller, Seattle, WA (US); Scott A. Green, North Bend, WA (US); Brian C. Beckman, Newcastle, WA (US); Scott Isaacs, Bellevue, WA (US); Amir Navot, Seattle, WA (US); Fabian Hensel, Zurich (CH); Avi Bar-Zeev, Oakland, CA (US); Severan Sylvain Jean-Michel Rault, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/502,707

(22) Filed: Sep. 30, 2014

(65) Prior Publication Data
US 2015/0120094 A1    Apr. 30, 2015

Related U.S. Application Data

(60) Provisional application No. 61/896,065, filed on Oct. 26, 2013, provisional application No. 61/901,431, filed on Nov. 7, 2013.

(51) Int. Cl.
| | | |
|---|---|---|
| *B64D 1/12* | (2006.01) | |
| *G05D 1/00* | (2006.01) | |
| *B64C 39/02* | (2006.01) | |
| *G01C 21/36* | (2006.01) | |
| *G06Q 10/08* | (2012.01) | |
| *G01C 21/20* | (2006.01) | |

(52) U.S. Cl.
CPC ............... *B64D 1/12* (2013.01); *B64C 39/024* (2013.01); *G01C 21/20* (2013.01); *G05D 1/00* (2013.01); *G06Q 10/083* (2013.01); *B64C 2201/027* (2013.01); *B64C 2201/042* (2013.01); *B64C 2201/128* (2013.01)

(58) Field of Classification Search
CPC ............. B64D 1/12; G05D 1/00; G01C 21/36; G01C 21/20; B64C 39/024; B64C 2201/027; B64C 2201/042; B64C 2201/128; G06Q 10/083
USPC ........................................................... 701/3
See application file for complete search history.

(56) References Cited

U.S. PATENT DOCUMENTS 7,631,834 B1 * 12/2009 Johnson ................ B64C 39/024
                                                244/17.11
9,046,892 B2 *  6/2015 Jang .................... G06Q 10/0631
(Continued)

OTHER PUBLICATIONS

"International Search Report and Written Opinion of PCT Application No. PCT/US2014/058497, mailed Dec. 29, 2014."
John Robb, "Dronenet the Next Big Thing," pp. 1-3, Jan. 2, 2013.

*Primary Examiner* — Atul Trivedi
(74) *Attorney, Agent, or Firm* — Athorus, PLLC

(57) ABSTRACT

This disclosure describes an unmanned aerial vehicle ("UAV") configured to autonomously deliver items of inventory to various destinations. The UAV may receive inventory information and a destination location and autonomously retrieve the inventory from a location within a materials handling facility, compute a route from the materials handling facility to a destination and travel to the destination to deliver the inventory.

24 Claims, 16 Drawing Sheets

(56) References Cited

U.S. PATENT DOCUMENTS

| | | | |
|---|---|---|---|
| 9,051,043 B1 | 6/2015 | Peeters | |
| 2004/0135031 A1* | 7/2004 | Stupakis | B64C 39/02 244/120 |
| 2005/0154653 A1* | 7/2005 | Jongebloed | G06Q 10/087 705/28 |
| 2008/0228335 A1* | 9/2008 | Bodin | G05D 1/0094 701/26 |
| 2010/0004802 A1* | 1/2010 | Bodin | G05D 1/0094 701/11 |
| 2010/0131121 A1* | 5/2010 | Gerlock | G08G 5/0013 701/2 |
| 2010/0169199 A1 | 7/2010 | Fuller et al. | |
| 2011/0017863 A1* | 1/2011 | Goossen | F41G 7/303 244/3.14 |
| 2011/0084162 A1* | 4/2011 | Goossen | B64C 39/024 244/12.1 |
| 2011/0130636 A1* | 6/2011 | Daniel | G08B 25/016 600/301 |
| 2011/0208373 A1* | 8/2011 | Lees | B64C 39/024 701/2 |
| 2011/0240383 A1* | 10/2011 | Gettings | B62D 55/075 180/9.1 |
| 2012/0143482 A1* | 6/2012 | Goossen | G08G 5/0034 701/120 |
| 2012/0271461 A1* | 10/2012 | Spata | G01W 1/00 700/276 |
| 2013/0072228 A1 | 3/2013 | Naguib et al. | |
| 2013/0240673 A1* | 9/2013 | Schlosser | G05D 1/101 244/137.1 |
| 2014/0032034 A1* | 1/2014 | Raptopoulos | G08G 5/0069 701/25 |
| 2014/0316616 A1* | 10/2014 | Kugelmass | G05D 1/101 701/8 |
| 2015/0336671 A1* | 11/2015 | Winn | B64C 39/024 701/3 |
| 2015/0370251 A1* | 12/2015 | Siegel | G05D 1/0027 701/2 |
| 2016/0033966 A1* | 2/2016 | Farris | G01C 21/00 701/15 |
| 2016/0068264 A1* | 3/2016 | Ganesh | G08G 5/0069 701/2 |

* cited by examiner

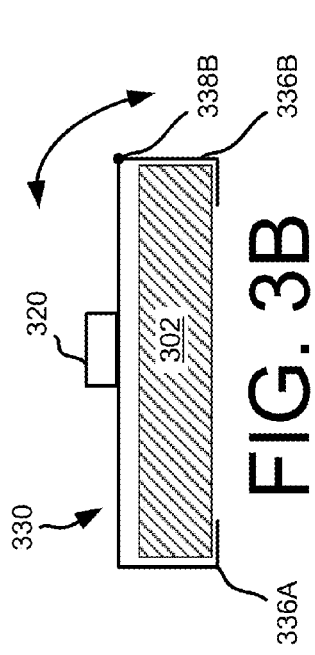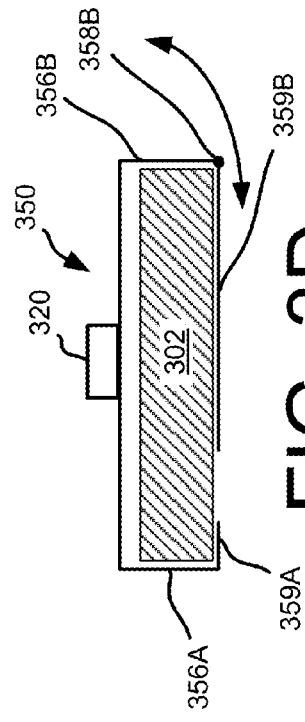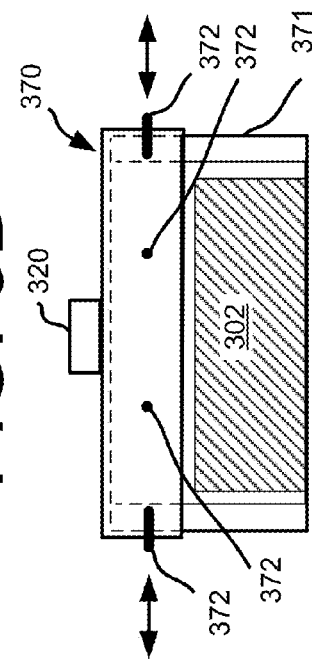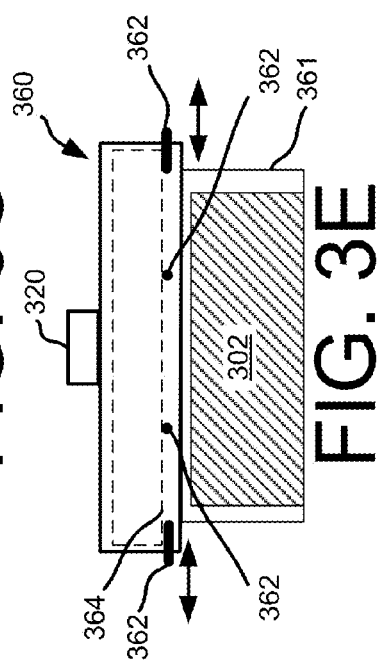

UNMANNED AERIAL VEHICLE DELIVERY SYSTEM

CROSS-REFERENCE TO RELATED APPLICATION

This application claims priority to U.S. Provisional Application 61/896,065, filed Oct. 26, 2013, entitled "Automated Aerial Delivery Vehicle," and U.S. Provisional Application 61/901,431, filed Nov. 7, 2013, entitled "Automated Aerial Delivery Vehicle Routine And Safety," both of which are incorporated herein by reference in their entirety.

BACKGROUND

Physical delivery of items to user specified locations has improved dramatically over the years, with some retailers offering next day delivery of ordered items. The final, or last mile delivery of physical items to a user specified location is traditionally accomplished using a human controlled truck, bicycle, cart, etc. For example, a user may order an item for delivery to their home. The item may be picked from a materials handling facility, packed and shipped to the customer for final delivery by a shipping carrier. The shipping carrier will load the item onto a truck that is driven by a human to the final delivery location and the human driver, or another human companion with the driver, will retrieve the item from the truck and complete the delivery to the destination. For example, the human may hand the item to a recipient, place the item on the user's porch, store the item in a post office box, etc.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 3A-3G depict block diagrams of various inventory engagement mechanisms for engaging and disengaging inventory handled by the unmanned aerial vehicle illustrated in FIG. 2, according to an implementation.

Figure 1:
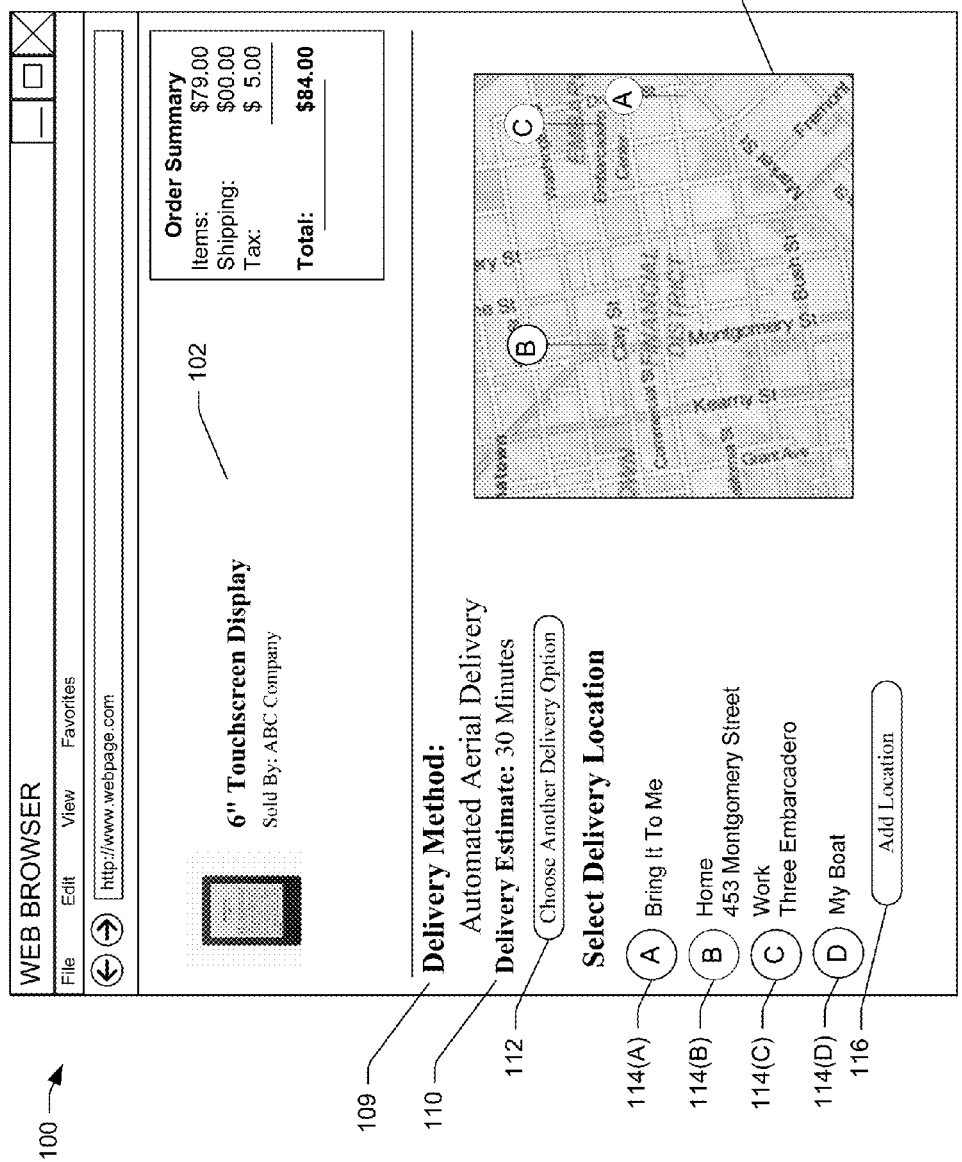
FIG. 1 depicts a graphical user interface for selecting a delivery option for the delivery of an item, in an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes an unmanned aerial vehicle ("UAV") configured to autonomously deliver items of inventory to various delivery locations. As discussed in further detail below, in some implementations, the UAV may receive delivery parameters (e.g., item information, source location information, and/or delivery location information), autonomously or semi-autonomously retrieve the item(s) from a source location (e.g., a materials handling facility or a third party seller), compute a route from the source location to a delivery location, and aerially transport the retrieved item(s) to the delivery location. In some implementations, the UAV will communicate with other UAVs in the area to obtain information used in route planning. This information may be stored in a central location and/or dynamically shared between nearby UAVs, materials handling facilities, relay locations, a UAV management system and/or secure delivery locations. For example, other UAVs may provide information regarding weather (e.g., wind, snow, rain), landing conditions, traffic, etc. The UAV may utilize this information to plan the route from the source location to the delivery location and/or to modify the actual navigation of the route. In addition, in some implementations, the UAV may consider other environmental factors while navigating a route. For example, if the UAV's route must cross over a road built for automobiles, the navigation of the route may be adjusted to minimize the intersection between the UAV's path and the road. For example, the UAV may alter its navigation such that the path of the UAV will intersect with the automobile road at an approximately perpendicular angle.

In still other implementations, the UAV may constantly monitor for humans or other animals that may be in the path or planned path of the UAV and modify the navigation of the UAV to avoid those humans or other animals.

When the UAV reaches the delivery location, it will identify an area at the delivery location where it can safely approach the ground, or another surface, and leave the inventory item, thereby completing the delivery. This may be done through assistance of a remote entity controller taking control of and/or providing control instructions to the UAV to assist the UAV in landing at the delivery location. In other implementations, if the UAV has previously landed at the delivery location, it may use stored information about the delivery location (e.g., safe landing area, geographic coordinates of the landing area) to navigate the landing at the delivery location. Upon completion of the delivery, the UAV may return to a materials handling facility or another location to receive different inventory, recharge, etc.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A delivery location, as used herein, refers to any location at which one or more inventory items may be delivered. For example, the delivery location may be a person's residence, a place of business, a location within a materials handling facility (e.g., packing station, inventory storage), any location where a user or inventory is located, etc. Inventory or items may be any physical goods that can be transported using a UAV.

A "relay location" as used herein may include, but is not limited to, a delivery location, a materials handling facility, a cellular tower, a rooftop of a building, a secure delivery location, or any other location where a UAV can land, charge, retrieve inventory, replace batteries, and/or receive service.

FIG. 1 depicts a graphical user interface 100 for selecting a delivery option for the delivery of an item, according to an implementation. In this example, the user has requested to purchase an electronic device titled "6" Touch Screen Display" 102 sold by ABC Company. As part of the purchase process, the user may select one or more delivery methods that may be used to deliver the selected item. In this example, the user has selected "Automated Aerial Delivery" 109 with a delivery time estimate 110 of 30 minutes. If the user does not desire to receive the item via automated aerial delivery, the user may choose another delivery option by selecting the "Choose Another Delivery Option" 112 button. In still another implementation, the user may select a delivery time for the aerial delivery. For example, if the user does not desire to receive the item, in this example, in 30 minutes, they may select another time at which they would like to receive the item.

In addition to selecting a delivery method, the user may choose a delivery location 114. With the implementations described herein, a user now has the ability to choose "Bring It To Me" 114(A). With this option, the actual location of the user is determined and the UAV delivers the item to the current location of the user. The current location of the user may be based on, for example, a determined location of a portable device (e.g., mobile phone) associated with the user, the location of the network utilized by the user when placing the order, etc. For example, the user may identify their current location by allowing Global Positioning System ("GPS") data to be provided by their mobile device. Alternatively, if the user is connected through a wireless network (e.g., cellular, Wi-Fi, satellite), the location of the network may be determined and used as the current location of the user.

In some implementations, the location of the user may be maintained and updated until the item is delivered to the user. If the current location of the user is determined based on the GPS data from the user's mobile device, the GPS data may be periodically retrieved by the UAV management system (discussed below) and the delivery destination updated as the GPS data changes. For example, the user may place an order for an item while at home, select to have the item delivered to their current location (delivery within 30 minutes of the order) and then leave to go to their friend's house, which is three blocks away from their home. As the ordered item is retrieved from inventory, the current location of the user's mobile device may be determined and the delivery location correspondingly updated. As such, the ordered item will be delivered to the user while the user is at their friend's house, or any other location.

In a similar manner, if the user does not desire to have the item delivered to their current location, another location may be selected from either the list of locations 114 or select a location on the presented map 118. The list of locations 114 may include other locations for which the user has received items via delivery from a UAV, other locations near the user that can receive UAV deliveries, or other locations that are configured to enable tracking of the current location of the vehicle.

For example, the user may have previously had an item delivered using a UAV to their home, as illustrated by the home delivery location option 114(B). Likewise, there may be a secure delivery location (discussed below) near the person's place of employment, as illustrated by the work delivery location option 114(C). Alternatively, the user may have identified another location for which location information can be determined and used for item delivery. In this example, the user has provided information that can be used to determine the current location of the user's boat. The location of the user's boat may be determined based on the GPS of the boat and retrieving GPS data from the boat. In still other examples, the user can add other locations through selection of the "Add Location" button 116 or selecting a location on the map 118.

Upon user selection of a delivery location, the estimated delivery time may be dynamically updated to reflect the estimated amount of time needed for the UAV to deliver the item to the delivery location. For example, the user's boat may be physically farther from the source location than the user's home. As such, the delivery estimate time may change. Upon selection of a delivery method and delivery location, the UAV management system may process the user's order for aerial delivery to the selected delivery location.

Figure 2:
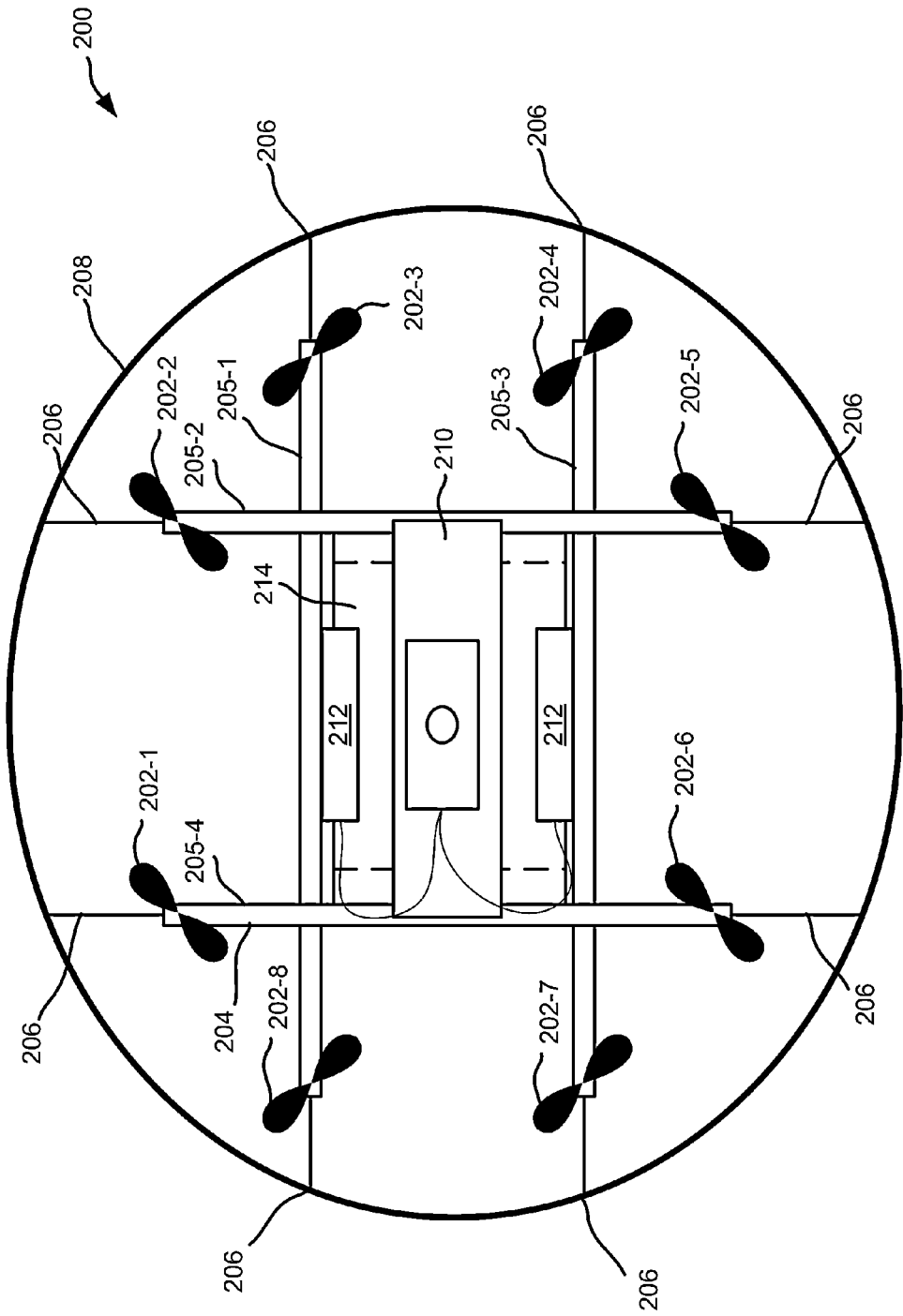
FIG. 2 depicts a block diagram of a top-down view of an unmanned aerial vehicle, according to an implementation.

FIG. 2 illustrates a block diagram of a top-down view of a UAV 200, according to an implementation. As illustrated, the UAV 200 includes eight propellers 202-1, 202-2, 202-3, 202-4, 202-5, 202-6, 202-7, 202-8 spaced about the frame 204 of the UAV. The propellers 202 may be any form of propeller (e.g., graphite, carbon fiber) and of a size sufficient to lift the UAV 200 and any inventory engaged by the UAV 200 so that the UAV 200 can navigate through the air to deliver the item(s) to a delivery location. While this example includes eight propellers, in other implementations, more or fewer propellers may be utilized. Likewise, in some implementations, the propellers may be positioned at different locations on the UAV 200. In addition, alternative methods of propulsion may be utilized as "motors" in implementations described herein. For example, fans, jets, turbojets, turbo fans, jet engines, internal combustion engines, and the like may be used (either with propellers or other devices) to propel the UAV.

The frame 204 of the UAV 200 may likewise be of any suitable material, such as graphite, carbon fiber and/or aluminum. In this example, the frame 204 of the UAV 200 includes four rigid members 205-1, 205-2, 205-3, 205-4, or beams arranged in a hash pattern with the rigid members intersecting and joined at approximately perpendicular angles. In this example, rigid members 205-1 and 205-3 are arranged substantially parallel to one another and are approximately the same length. Rigid members 205-2 and 205-4 are arranged substantially parallel to one another, yet perpendicular to rigid members 205-1 and 205-3. Rigid members 205-2 and 205-4 are approximately the same length. In some embodiments, all of the rigid members 205 may be of approximately the same length, while in other implementations, some or all of the rigid members may be of different lengths. Likewise, the spacing and/or orientation between the two sets of rigid members may be approximately the same or different.

While the implementation illustrated in FIG. 2 includes four rigid members 205 that are joined to form the frame 204, in other implementations, there may be fewer or more components to the frame 204. For example, rather than four rigid members, in other implementations, the frame 204 of the UAV 200 may be configured to include six rigid members. In such an example, two of the rigid members 205-2, 205-4 may be positioned parallel to one another. Rigid members 205-1, 205-3 and two additional rigid members on either side of rigid members 205-1, 205-3 may all be positioned parallel to one another and perpendicular to rigid members 205-2, 205-4. With additional rigid members, additional cavities with rigid members on all four sides may be formed by the frame 204. As discussed further below, a cavity within the frame 204 may be configured to include an inventory engagement mechanism for the engagement, transport and delivery of item(s) and/or containers that contain item(s).

In some implementations, the UAV may be configured to reduce aerodynamic resistance. For example, an aerodynamic housing may be included on the UAV that encloses the UAV control system 210, one or more of the rigid members 205, the frame 204 and/or other components of the UAV 200. The housing may be made of any suitable material(s) such as graphite, carbon fiber, aluminum, titanium, magnesium, fiberglass, etc. Likewise, in some implementations, the location and/or the shape of the inventory (e.g., item or container) may be aerodynamically designed. For example, in some implementations, the inventory engagement mechanism may be configured such that when the inventory is engaged it is enclosed within the frame and/or housing of the UAV 200 so that no additional drag is created during transport of the inventory by the UAV 200. In other implementations, the inventory may be shaped to reduce drag and provide a more aerodynamic design of the UAV and the inventory. For example, if the inventory is a container and a portion of the container extends below the UAV when engaged, the exposed portion of the container may have a curved shape.

The propellers 202 and corresponding propeller motors are positioned at both ends of each rigid member 205. The propeller motors may be any form of motor capable of generating enough speed with the propellers to lift the UAV 200 and any engaged inventory thereby enabling aerial transport of the inventory. For example, the propeller motors may each be a FX-4006-13 740 kv multi rotor motor.

Extending outward from each rigid member is a support arm 206 that is connected to a safety barrier 208. In this example, the safety barrier is positioned around and attached to the UAV 200 in such a manner that the motors and propellers 202 are within the perimeter of the safety barrier 208. The safety barrier may be plastic, rubber, etc. Likewise, depending on the length of the support arms 206 and/or the length, number or positioning of the rigid members 205, the safety barrier may be round, oval, or any other shape.

Mounted to the frame 204 is the UAV control system 210. In this example, the UAV control system 210 is mounted in the middle and on top of the frame 204. The UAV control system 210, as discussed in further detail below with respect to FIG. 14, controls the operation, routing, navigation, communication and the inventory engagement mechanism of the UAV 200.

Likewise, the UAV 200 includes one or more power modules 212. In this example, the UAV 200 includes two power modules 212 that are removably mounted to the frame 204. The power module(s) for the UAV may be in the form of battery power, solar power, gas power, super capacitor, fuel cell, alternative power generation source, or a combination thereof. For example, the power modules 212 may each be a 6000 mAh Lithium Polymer (lipo) battery. The power module(s) 212 are coupled to and provide power for the UAV control system 210 and the propeller motors.

In some implementations, one or more of the power modules may be configured such that it can be autonomously removed and/or replaced with another power module while the UAV is landed. For example, when the UAV lands at a secure delivery location, relay location and/or materials handling facility, the UAV may engage with a charging member at the location that will recharge the power module. In some implementations, a container may include a power module and when the engagement mechanism of the UAV engages with the container, the power module of the container may provide power to the UAV. For example, when an item is being delivered to a secure delivery location, the power module included in the container may be utilized to power the UAV, rather than and/or in addition to the power modules 212 of the UAV 200. When the container is disengaged (e.g., when placed into the secure delivery location), the power provided by the container is removed and the UAV 200 operates using power from the UAV power module 212.

As mentioned above, the UAV 200 also includes an inventory engagement mechanism 214. The inventory engagement mechanism may be configured to engage and disengage items and/or containers that hold items. In this example, the inventory engagement mechanism 214 is positioned within a cavity of the frame 204 that is formed by the intersections of the rigid members 205. In this example, the inventory engagement mechanism is positioned beneath the UAV control system 210. In implementations with additional rigid members, the UAV may include additional inventory engagement mechanisms and/or the inventory engagement mechanism 214 may be positioned in a different cavity within the frame 204. The inventory engagement mechanism may be of any size sufficient to securely engage and disengage containers that contain inventory. In other implementations, the engagement mechanism may operate as the container, containing the inventory item(s) to be delivered. The inventory engagement mechanism communicates with (via wired or wireless communication) and is controlled by the UAV control system 210.

While the implementations of the UAV discussed herein utilize propellers to achieve and maintain flight, in other implementations, the UAV may be configured in other manners. For example, the UAV may include fixed wings and/or a combination of both propellers and fixed wings. For example, the UAV may utilize one or more propellers to enable takeoff and landing and a fixed wing configuration or a combination wing and propeller configuration to sustain flight while the UAV is airborne.

FIGS. 3A-3G illustrate side views of various example configurations of the inventory engagement mechanism 214, illustrated in FIG. 2. Each inventory engagement mechanism is configured to define a cavity into which inventory and/or a container containing inventory may be positioned for the secure transport by a UAV. The cavity includes a top edge and side edges. In the examples illustrated in FIGS. 3A-3F, the cavity includes a top edge and four side edges. Two of the side edges are not shown so that the position, arrangement and operation of the other two side edges can be illustrated. In some implementations, the cavity may include fewer or additional edges.

Turning first to FIG. 3A, the inventory 302 is positioned within the inventory engagement mechanism 314 and held in position with angled support arms 316A and 316B. While the examples discussed with respect to FIGS. 3A-3D refer to inventory, in other implementations, the inventory engagement mechanisms discussed with respect to FIGS. 3A-3D operate in a similar manner with containers.

In the example of FIG. 3A, both angled support arms are configured to pivot around pivot points 318A and 318B, respectively. The pivoting of the angled support arms are controlled by one or more motors 320, such as a servo motor. The motors 320 may likewise be controlled to open and close the angled support arms by the UAV control system 210. When the angled support arms 316A and 316B are in a closed position, the inventory 302 is securely held in the inventory engagement mechanism 314 and can be aerially transported by the UAV 200. When the angled support arms are in an open position, the inventory 302 is released from the inventory engagement mechanism and exits the inventory engagement mechanism under gravitational force.

When the UAV 200 is retrieving inventory, it may position the inventory engagement mechanism 314 over the inventory, open the angled support arms 316A, 316B and lower itself, and thus the inventory engagement mechanism 314 down and around the inventory 302. As it reaches the inventory 302, the UAV control system 210 may instruct the motor(s) 320 to begin closing the angled support arms 316A, 316B and continue to align the inventory engagement mechanism 314 around the inventory 302 so that as the angled support arms 316A, 316B close, the leading edge of each angled support arm will move underneath the inventory thereby securely enclosing the inventory 302 in the inventory engagement mechanism 314.

Likewise, when the UAV 200 is disengaging inventory (e.g., as part of inventory delivery), it may position itself and thus the inventory engagement mechanism 314 over a delivery location (e.g., flat surface, ground, table, chair, balcony) and the UAV control system 210 may instruct the motor(s) 320 to begin opening the angled support arms 316A, 316B. As the angled support arms open or move away from the inventory, gravity will extract the inventory 302 from the inventory engagement mechanism 314 and the inventory 302 will come to rest on the flat surface. When the inventory has been disengaged, the UAV 200 may reposition or close the angled support arms 316A, 316B and navigate away from the area.

FIG. 3B illustrates another side view of an example configuration of an inventory engagement mechanism 330 that may be coupled to the UAV 200 and used to engage and disengage inventory 302 to enable transport and delivery of the inventory 302. In this example, the inventory engagement mechanism 330 includes a cavity with two angled support arms 336A, 336B. However, in comparison to FIG. 3A, only one of the angled support arms 336B is configured to pivot about a point 338B. Similar to FIG. 3A, the pivot may be controlled by a motor 320, such as a servo motor. Likewise, the servo motor may be controlled by the UAV control system 210.

In the FIG. 3B example, the inventory is securely held in the inventory engagement mechanism 330 when the angled support arm 336B is in a closed position and will exit the inventory engagement mechanism when the angled support arm 336B is in an open position (positioned away from inventory 302).

FIG. 3C illustrates another side view of an example configuration of an inventory engagement mechanism 340 that may be coupled to the UAV 200 and used to engage and disengage inventory 302 to enable transport and delivery of the inventory 302. In this example, the inventory engagement mechanism 340 includes two angled support arms 346A, 346B. However, in comparison to FIG. 3A, rather than the entire angled support arm pivoting, only the bottom protruding edges/surfaces 349A, 349B pivot about pivot points 348A, 348B, respectively. Similar to FIG. 3A, the pivot of each bottom protruding edge 349A, 349B may be controlled by a motor 320, such as a servo motor. Likewise, the servo motor may be controlled by the UAV control system 210.

In the FIG. 3C example, the inventory is securely held in the inventory engagement mechanism 340 when the bottom protruding edges 349A, 349B of each angled support arm are in a closed position. Likewise, the inventory 302 will exit the inventory engagement mechanism 340 when one or both of the bottom protruding edges 349A, 349B are in an open position.

FIG. 3D illustrates another side view of an example configuration of an inventory engagement mechanism 350 that may be coupled to the UAV 200 and used to engage and disengage inventory 302 to enable transport and delivery of the inventory 302. In this example, the inventory engagement mechanism 350 includes two angled support arms 356A, 356B, each of which have bottom protruding edges/surfaces 359A, 359B. In comparison to FIG. 3C, only one of the bottom protruding edges, in this example bottom protruding edge 359B, is configured to pivot about a point 358B. Similar to FIG. 3A, the pivot may be controlled by a motor 320, such as a servo motor. Likewise, the servo motor may be controlled by the UAV control system 210.

In the FIG. 3D example, the inventory is securely held in the inventory engagement mechanism 350 when the bottom protruding edge 359B is in a closed position and will exit the inventory engagement mechanism when the bottom protruding edge 359B is in an open position.

In FIG. 3E, the inventory 302 is enclosed in a container 361 that is removably connected to the inventory engagement mechanism 360. The container 361 is connected with the inventory engagement mechanism through a series of members (e.g., pins) 362 or gears that are configured to engage and/or disengage the container. The positioning of the members 362 or gears are controlled by one or more motors 320, such as a servo motor. Alternatively, the members 362 or gears may be electromechanically controlled. For example, when there is no power and thus no magnetic charge, springs may cause the members 362 to move to an extended position, thereby securing the container in the inventory engagement mechanism. Likewise, when no power is applied, the gears may be locked into place so that the container is secured into the inventory engagement mechanism, as discussed below. Conversely, when power is applied, the resulting magnetic charge will cause the members to retract into the inventory engagement mechanism, thereby releasing a previously secured container from the inventory engagement mechanism. Likewise, gears may be configured to freely rotate when power is applied, thereby releasing the container from the inventory engagement mechanism.

The motors 320 may likewise be controlled to extend or retract the members 362 or rotate the gears, by the UAV control system 210. When the inventory engagement mechanism is positioned around the container 361 and the members 362 are in an extended position, the members securely hold the container, and thus the inventory 302, in the inventory engagement mechanism. In this example, the container has an extended ridge 364 that fits within the cavity of the inventory engagement mechanism 360. When the container is positioned within the cavity of the inventory engagement mechanism 360 and the members are in an extended position, the members are positioned under the ridge 364 thereby securing the container in the inventory engagement mechanism 360. When the members 362 are retracted, the container 361 is released from the inventory engagement mechanism and exits the inventory engagement mechanism 360 under gravitational force. Likewise, rather than members, gears with extended teeth may rotate within the cavity of the inventory engagement mechanism and engage slots in the sides of the container 361. When the container is positioned within the cavity of the inventory engagement mechanism 360, the gears may rotate and the teeth of the gears engage with slots in the side of the container 361, thereby securing the container in the inventory engagement mechanism 360. When the gears are rotated in an opposite direction, the container 361 is expelled from the cavity of the inventory engagement mechanism 360 and released.

When the UAV 200 is engaging a container 361, it may position the inventory engagement mechanism 360 over the container 361 and lower itself, and thus the inventory engagement mechanism 360 down and around the container 361. When the ridge 364 of the container 361 is within the cavity of the inventory engagement mechanism 360, the UAV control system 210 may instruct the motor(s) 320 to begin extending the members 362 such that the members become positioned beneath the extended ridge 364 of the container, thereby securing the container 361 in the inventory engagement mechanism 360. In implementations utilizing gears, the gears may be allowed to rotate freely as the UAV descends onto the container 361. When the container is inside the inventory engagement mechanism and the gears have rotated into the slots on the sides of the container 361, the gears may be locked into place, or prohibited from rotating in an opposite direction, thereby securing the container 361 in the cavity of the inventory engagement mechanism 360.

Likewise, when the UAV 200 is disengaging a container (e.g., as part of a delivery), it may position itself and thus the inventory over a surface (e.g., ground, table, chair, balcony) and the UAV control system 210 may instruct the motor(s) 320 to begin retracting the members 362 or rotating the gears in an opposite direction. When the members retract, gravity will extract the container 361 from the inventory engagement mechanism 360 such that the container 361 will come to rest on the flat surface. Likewise, when the gears rotate in the opposite direction, the container will be released from the inventory engagement mechanism and come to rest on the surface. When the container 361 has been disengaged, the UAV 200 may navigate away from the area.

FIG. 3F illustrates another side view of an example configuration of an inventory engagement mechanism 370 that may be coupled to the UAV 200 and used to engage and disengage a container 371 that holds inventory 302, thereby enabling transport and delivery of the inventory 302. In this example, the inventory engagement mechanism 370 includes a series of members 372 that are configured to extend or retract, for example through the use of electromagnetics as discussed above. Alternatively, or in addition thereto, the inventory engagement mechanism may utilize gears that rotate within the inventory engagement mechanism.

Similar to FIG. 3E, when the members are extended and/or the gears rotated, they engage and secure a container 371 within the inventory engagement mechanism 370. When the members 372 are retracted or the gears rotated in an opposite direction, the container is released from the inventory engagement mechanism 370. However, in comparison to the container 361 illustrated in FIG. 3E, the container 371 of FIG. 3F may not have an extended ridge 364 under which the members position. Instead, the container 371 may have one or more openings, holes or slots into which the members 372 and/or gears of the inventory engagement mechanism may mate with the container, thereby securing the container into the inventory engagement mechanism. Similar to FIG. 3E, the extending and retracting of the members and/or rotation of the gears may be controlled by a motor 320, such as a servo motor. Likewise, the motor 320 may be controlled by the UAV control system 210.

In the FIG. 3F example, the container 371 is securely held in the inventory engagement mechanism 370 when the members 372 are extended and will exit the inventory engagement mechanism when the members 372 are retracted. Likewise, when using gears, the container 371 is securely held in the inventory engagement mechanism 370 when the gears are rotated and mate with the slots of the container 371 and will exit the inventory engagement mechanism when the gears are rotated in an opposite direction and disengage with the slots of the container 371.

Figure 3G:
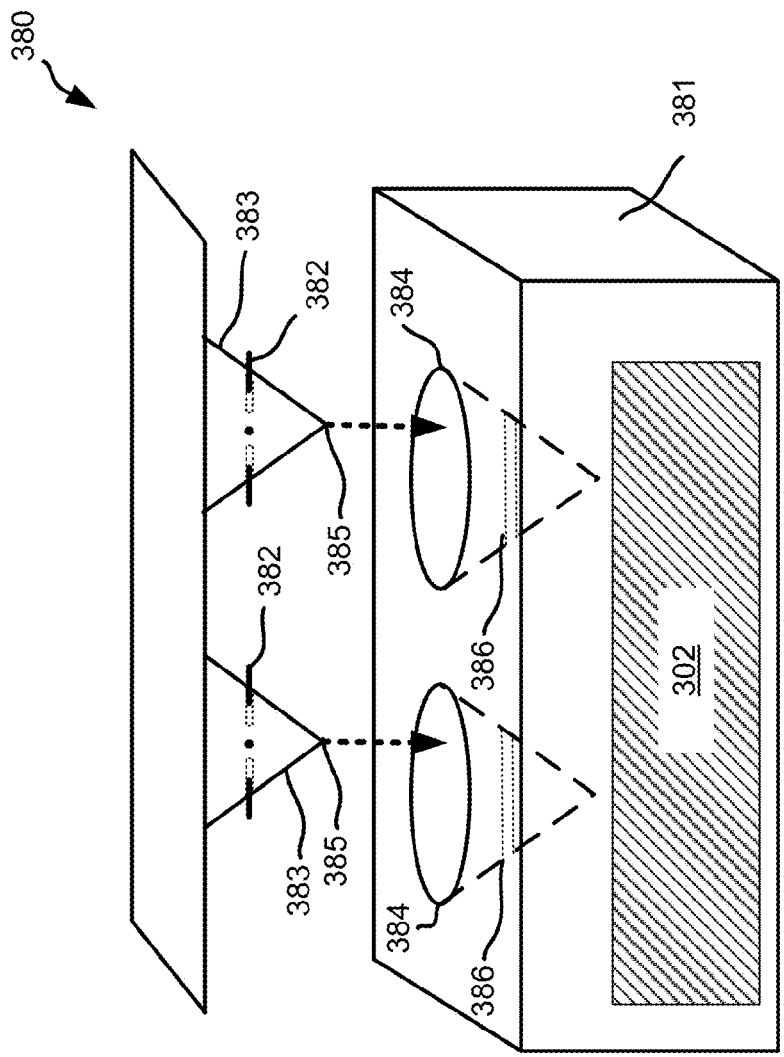

FIG. 3G illustrates yet another view of the inventory engagement mechanism 380 configured to engage and/or disengage a container 381 or other inventory, according to an implementation. In this example, the inventory engagement mechanism 380 may include one or more conical or other shaped extrusions 383 that extend from the inventory engagement mechanism 380 toward the container 381. Likewise, the container 381 may include one or more conical or other correspondingly shaped indentations 384 into which the inventory engagement mechanism 380 extrusions 383 mate. As illustrated in FIG. 3G, the inventory engagement mechanism 380 includes two conical shaped extrusions 383 that extend downward toward the container 381. In other implementations, more or fewer extrusions 383 may be used. Likewise, the container 381 includes corresponding conical indentations 384 into which the extrusions 383 of the inventory engagement mechanism 380 may mate when the UAV 200 is positioned over and onto the container 381.

While the example illustrated in FIG. 3G depicts the extrusions 383 extending downward and into a top of the container 381, in other implementations, the extrusions 383 may have other orientations. For example, one or more extrusions may be oriented at approximately ninety degrees and configured to extend into a side of an indentation located on a side of the container 381. In one implementation, there are two extrusions oriented to extend into opposing sides of the container 381. In such an implementation, the extrusions may be horizontally adjustable with respect to one another to enable engagement and disengagement of the container. For example, the extrusions may be adjusted to an open or extended position that is wider than the container. When the UAV is positioned over the container with the extrusions on either side of the container, the extrusions may be horizontally moved to a closed or retracted position in which each extrusion mates with a respective indentation on the container 381, thereby engaging the container for transport.

The shape of the extrusions and corresponding indentations provide assistance in the alignment between the UAV 200 and the container 381 and the ultimate engagement of the container 381 by the inventory engagement mechanism 383 of the UAV 200. For example, as long as the points 385 of the extrusions 383 pass into the openings of the indentations 384 of the container 381, the corresponding shapes will help align the UAV 200 as it continues to lower over the container.

Likewise, in some implementations, the extrusions 383 may include one or more members 382 (e.g., pins) that may be used to secure the container to the inventory engagement mechanism 380 when engaged. As discussed above, the members 382 may be controlled by a motor (not shown), such as a servo motor. In another implementation, the members 382 may be electromagnetically controlled. For example, springs may cause the members 382 to extend out of the extrusions 383 when there is no electromagnetic charge. When a charge is applied, the electromagnet may cause the members 382 to retract into the extrusions 383.

The container 381 may include one or more rings, recesses, openings, or other forms of slots 386 within the indentations 384 into which the members 382 may extend to secure the container to the inventory engagement mechanism 380. For example, the members 382 of the inventory engagement mechanism 380 may be retracted while the UAV is landing on the container 381. When the inventory engagement mechanism 380 has fully mated with the container 381, the members 382 may be released such that they extend into the slots 386 and secure the container 381 to the inventory engagement mechanism 380. In some implementations, the ends of the members 382 may be angled so that as the conical shaped extrusions 383 of the inventory engagement mechanism 380 mate with the indentations of the angle, the indentation will push the members 382 into the retracted position until they reach the slots 386 within the indentations and release, thereby securing the container 381.

While the example discussed above illustrates conical extrusions 383 and corresponding indentations 384 that are pointed, in other implementations, other shapes and/or sizes of extrusions and/or indentations may be utilized. For example, the extrusions and indentations may be curved rather than pointed. Likewise, rather than having the members 382 as part of the extrusions 383, in other implementations, the members may be included in the indentations 384 and the corresponding slots may be included in the extrusions 383.

The examples discussed above with respect to FIGS. 3A-3G are merely illustrative and it will be appreciated that the inventory engagement mechanism may be configured in many different forms. A feature of any inventory engagement mechanism configuration is the ability to securely engage and disengage inventory and/or containers so that the inventory and/or container can be aerially transported by a UAV 200 and delivered to a delivery location. For example, in addition to or as an alternative to utilizing pivoting angled support arms, members and/or gears, in some implementations, the angled support arms may be configured to move in a horizontal direction such that the size of the cavity formed to contain the inventory 302 or container can be adjusted to account for the size of the inventory and/or container to be engaged, transported and disengaged. As another example, in some implementations, the inventory engagement mechanism may include a positioning arm and/or cable that may be used to position, raise and/or lower inventory. In some implementations, the positioning arm or cable may operate as the inventory engagement mechanism. In other implementations, the positioning arm or cable may operate as part of an inventory engagement mechanism. In one implementation, a positioning cable may be included that removably attaches to the inventory and can be used to engage the inventory and raise the inventor up to a location of the UAV. Likewise, when the inventory is being disengaged at a delivery location, rather than having to land the UAV, the positioning cable may be extended so that the inventory is lowered to the landing area. When the inventory has reached the landing area, the positioning cable may be detached from the inventory and retracted back into the UAV.

Figure 4:
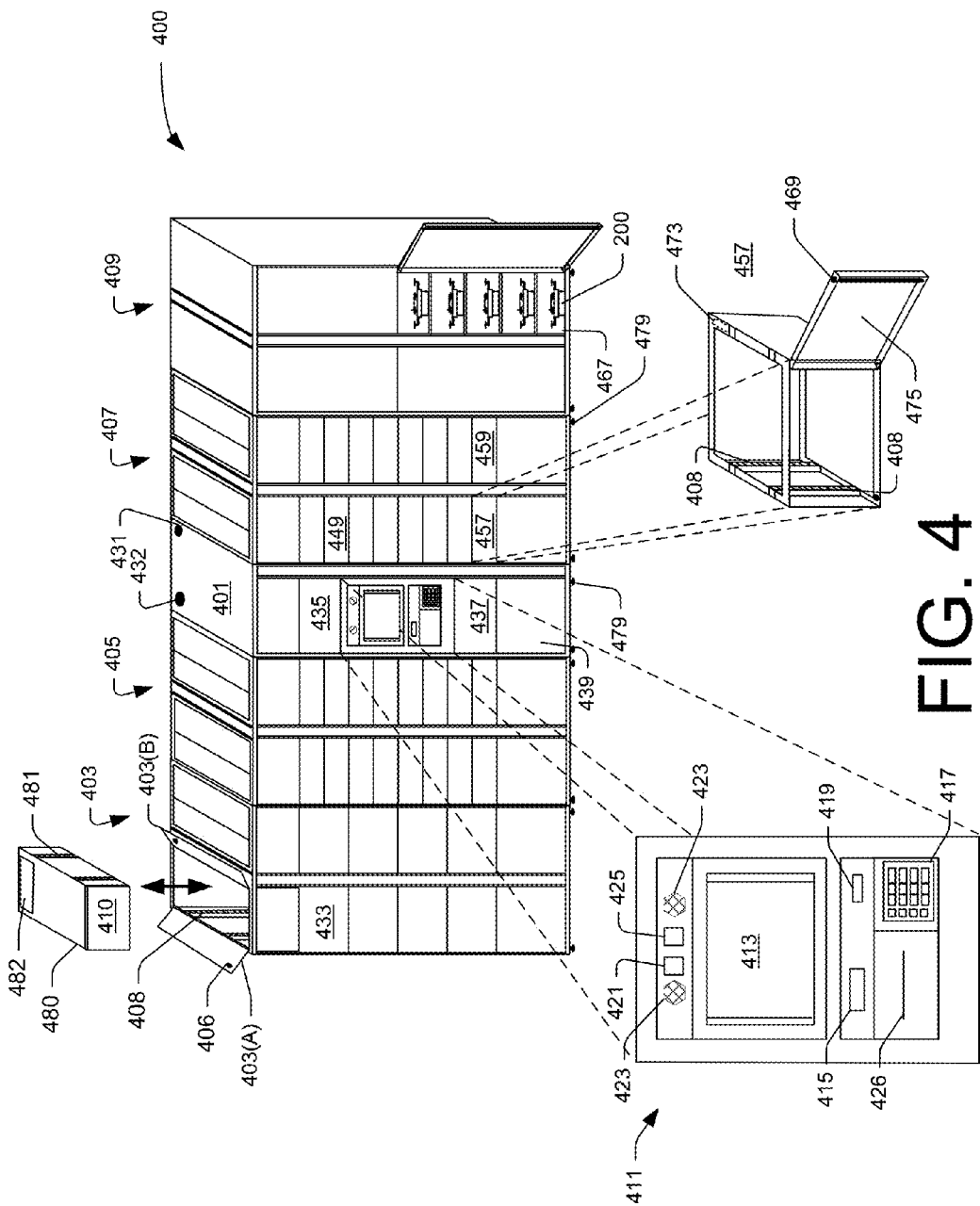
FIG. 4 depicts a block diagram of a secure delivery location, according to an implementation.

FIG. 4 depicts a block diagram of a secure delivery location 400, in one implementation. The secure delivery location 400 may include one or more control stations 401 and one or more storage compartment modules 403, 405, 407, 409. The control station 401 acts as the central control point for the secure delivery location 400, providing power, computing resources, user input and network access to the secure delivery location 400. For example, control station 401 may include an internal computing system (not shown), or other computing system, that is capable of maintaining state information for each storage compartment at the secure delivery location 400 and providing other computing functions. For example, the internal computing system may include a command component that maintains information as to which storage compartments of the secure delivery location 400 are empty, which storage compartments include inventory items and/or containers that contain inventory items, the access code(s) or other identifier(s) necessary to open each of the storage compartments and any other information necessary to maintain the secure delivery location. The command component may also issue commands or instructions to the storage compartment modules to lock/unlock storage compartments, active and/or deactivate sensors, and the like.

The secure delivery location 400 may be configured to obtain and/or provide information to a remote computing resource, such as the UAV management system (FIG. 5), UAVs, materials handling facilities, relay locations, or may be configured to operate primarily as a stand-alone unit, with limited external communication.

In communicating with UAVs, the control station 401 may be configured to identify when a UAV is arriving, determine a storage compartment module 403, 405, 407, 409 into which the UAV is to place a container 480, open the storage compartment module to allow placement of the container 480 by a UAV and/or take control of the UAV to assist in landing the UAV at the secure delivery location 400. For example, as a UAV approaches the secure delivery location 400, the control station 401 may identify the UAV and determine that the UAV is to disengage a container 480 into the storage compartment module 403. The top doors 403(A) and 403(B) of the storage compartment module 403 may be opened by the control system 401 and one or more cameras 406, and/or other input components, activated to monitor the position of the UAV 200 (not shown). The cameras 406 may be positioned inside the storage compartment modules and only visible externally when the top doors are opened, may be positioned on another exterior surface of the secure delivery location 400 and/or may be positioned remote from the secure delivery location 400 and in communication (e.g., wired and/or wireless) with the control station 401.

As the UAV approaches, the control station 401 may operate as a remote entity controller and request control of the UAV so that it can control the landing of the UAV and/or disengagement of the container 480 into the opening of the storage compartment module 403. As discussed below with respect to FIG. 13, upon taking control of the UAV, the control station 401 may monitor the position of the UAV by processing images of the UAV captured by the one or more cameras 406 and provide navigation instructions to the UAV that will cause the UAV to descend over the opening in the storage compartment module 403 and insert the container 480 into the opening of the storage compartment module 403. In some implementations, a series of instructions may be provided to the UAV by the remote entity controller to enable positioning of the UAV over the storage compartment module 403. For example, the remote entity controller may capture one or more images of the UAV, determine and provide instructions to the UAV and the UAV may execute the instructions. During and after execution of the instructions, the remote entity controller may continue to monitor the UAV and provide additional instructions to the UAV. This process may continue until the UAV has landed or reached a determined height above the landing area.

In some implementations, the sides of the container 480 include slots 481 that are configured to mate with the gears of the inventory engagement mechanism of the UAV (discussed above) as well as mate with gears 408 within the storage compartment module 403. As the container is lowered by the UAV into the opening of the storage compartment module 403, the gears 408 within the storage compartment module 403 may rotate such that the teeth of the gears mate with the slots 481 of the container 480, thereby securing the container 480 in the storage compartment module 403. Once the container 480 is secured by the storage compartment module 403, the control station 401 may instruct the UAV to disengage the container 480.

In other implementations, rather than having the UAV lower the container into the storage compartment module 403, in some implementations, when the top doors of the storage compartment module 403 open, a shelf (not shown) or other support platform may be extended out of and above the opening of the storage compartment module 403. In such an implementation, the UAV may place the container 480 onto the shelf and disengage from the container 480. Once the UAV has disengaged from the container 480, the shelf and container 480 may be lowered back into the storage compartment module 403 and secured.

In some implementations, the gears 408 of the storage compartment module 403 may be configured to provide electrical connectivity to the container 481 and/or through the container to the UAV. As noted above, the container 480 may include a power module 482 and the gears 408 may be configured so that when the container 480 is engaged, the connection between the gears 408 and the container 480 can be used to provide power to and recharge the power module 482. Likewise, gears may also be configured to provide electrical connection to the UAV to recharge the power module 212 of the UAV 200.

Once the UAV 200 has disengaged the container 480 and separated, the control system 401 may coordinate the placement of the container within the secure delivery location 400, provide a notification to the inventory management system that the item has been delivered and/or notify the customer that the item has been delivered to the secure delivery location 400 and is available for retrieval. For example, the gears 408 may be used to move the container 480 within the secure delivery location 400 and position the container 480 in one of the storage compartments 433. The container may be configured such that it is the same size as a storage compartment 433 and such that the front side 410 of the container 480 will open when the user is provided access to the storage compartment 433.

The control station 401 may also include a user interface 411. The user interface 411 is configured to receive and provide information to one or more users of the secure delivery location 400 and may include, but is not limited to, a display 413, such as a touch-screen display, a scanner 415, a keypad 417, a biometric scanner 419, an audio transducer 421, one or more speakers 423, one or more image capture devices 425, such as a video camera, and any other types of input or output devices that may support interaction between the secure delivery location 400 and one or more users. For example, the user interface 411 may also include a credit card reader, the ability to accept money (such as cash or coins) and/or the ability to vend items (e.g., labels, envelopes, shipping packages) using a vending slot 426. Providing the ability for the secure delivery location 400 to accept credit cards and/or money enables the delivery of items to a storage compartment at the secure delivery location 400 for which the items are paid for at the time of pickup (e.g., cash on delivery). Likewise, enabling vending of items, such as labels or envelopes, supports the ability for users to utilize a secure delivery location to ship or deliver goods. In some implementations, items that are frequently purchased (often referred to as high velocity items) may be delivered to and stored in the secure delivery location prior to anyone ordering the item. When the item is ordered, it may be made available to the user for retrieval from the secure delivery location and/or the secure delivery location 400 may act as a source location, providing a container that includes the ordered item to a UAV that retrieves the container from the secure delivery location and provides it to another user selected delivery location.

Figure 5:
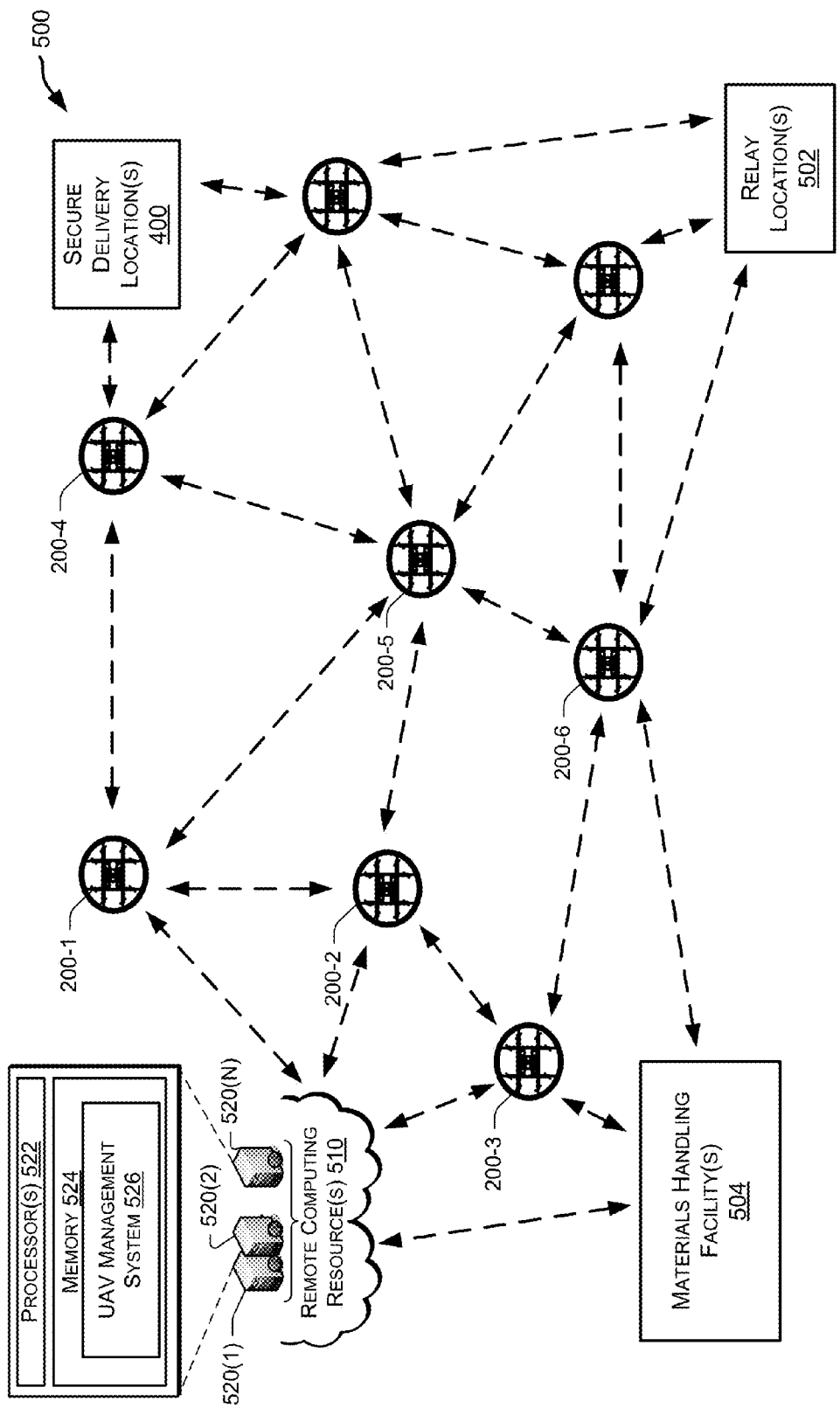
FIG. 5 depicts a diagram of a UAV environment, according to an implementation.

The control station 401 may also include a connector component configured to provide wired and/or wireless network connectivity with the other storage compartment modules 403, 405, 407, 409, as well as to remote computing devices (FIG. 5), materials handling facilities and/or UAVs. Wireless connectivity may be implemented using a wireless antenna 431, which may provide both receive and transmit functionality. Power and/or network communication with remote computing devices may be obtained from a main access point 432. In addition, in some implementations, the control station 401 may include one or more storage compartments 435, 437, 439. In comparison to the storage compartments 435, 437, 439 of the storage compartment modules, these storage compartments may store UAVs and/or parts, such as batteries, propellers, jets, etc., for use in servicing a UAV. Likewise, in some implementations, other storage compartment modules, such as storage compartment module 409 may not be configured to autonomously receive containers from UAVs. Instead, these storage compartment modules may operate in a more traditional manner providing storage for items, inventory, parts, UAVs, etc. For example, storage compartment 467 may include a number of shelves, each of which are configured to store a UAV that can be deployed by the control station 401 and/or by the UAV management system 526 (FIG. 5). In some implementations, the storage compartment 467 may be configured to provide a charge to the UAVs so that when deployed the UAVs will be fully powered for flight. When deploying a stored UAV, the control station 401 may provide instructions to open the door of the storage compartment 467 so that UAVs can disengage and fly out of the storage compartment. In such an implementation, access to the storage compartment and/or the door of the storage compartment may be oriented away from any area in which a human may interact with the secure delivery location 400.

A stored UAV, when deployed, may be used to expand the capacity of the UAV network and used to retrieve an item from a source location and deliver it to a destination location. Alternatively, a UAV may be deployed to replace another UAV that needs to be removed from service (e.g., to recharge and/or for repairs). In still other implementations, a UAV may only be temporarily deployed to assist in reconfiguring the placement of containers within a storage compartment module 403, 405, 407, 409 of the secure delivery location 400. For example, if the containers need to be repositioned such that empty containers can be retrieved and returned to the materials handling facility, a UAV 200 may be deployed to retrieve containers from the opening of the top of the storage compartment module, and reposition the containers within the secure delivery location 400.

The control station 401 may also include one or more connector components to which a storage compartment module, such as storage compartment module 405 or storage compartment module 407 may connect with the control station 401. For example, a connector component may provide power to storage compartment module 405 and another connector component may provide communication with storage compartment module 405. Likewise, the storage compartment modules may also include one or more connector components to provide power and connectivity to additional storage compartment modules.

Each storage compartment module, such as storage compartment modules 403, 405, 407, 409, may be configured so the secure delivery location 400 is modular, such that one or more storage compartment modules can be easily removed or added to the control station 401 of the secure delivery location 400. The ability to add or remove storage compartment modules at a secure delivery location 400 supports the ability to easily and quickly expand or remove capacity so that the demand for that secure delivery location can be satisfied. For example, during the holiday season, additional storage compartment modules may need to be added to the secure delivery location 400 to support the increased demand of items ordered by users. As storage compartment modules 403, 405, 407, 409 are added or removed from a secure delivery location 400, the control station 401 informs the UAV management system 526 of the added or removed capacity.

Each storage compartment module 403, 405, 407, 409 includes one or more storage compartments, one or more receptor components for connecting with connector components of a control station 401 (or another storage compartment module) and one or more connector components for allowing other storage compartment modules to connect thereto, thereby providing power and/or connectivity with the control station 401. The storage compartments of each storage compartment module may be of varying sizes and number. As shown, different storage compartment modules may be configured to receive and provide access to different sizes of containers. For example, storage compartment module 403 may be configured such that the storage compartments 433 are large enough to receive containers the size of container 480. In comparison, the storage compartment module 407 may have smaller storage compartments 449 that are configured to receive smaller containers. As such, storage compartment modules with different storage compartment sizes can be added to a secure delivery location 400 to optimize the storage compartment configuration to match that of the sizes of containers typically scheduled for aerial delivery to the secure delivery location.

In addition to including storage compartments, power and connectivity points, the storage compartment modules 403, 405, 407, 409 may also include one or more wireless antennas and/or one or more general computing systems, or a simpler computing system such as a printed circuit board, RFID tag, or anything else that may be detectable by the control station 401 and used to identify the storage compartment module. The computing component(s) of each storage compartment module may include a unique identifier of the storage compartment module and configuration information of the storage compartment module, which includes dimension information and location information of each storage compartment of the storage compartment module. The computing component may also include a storage compartment management component configured to control movement of containers between the storage compartments and/or to control the actuators that enable locking and unlocking of the storage compartment doors of the storage compartment module 403, 405, 407, 409 in response to receiving commands or instructions from a command component of the control station 401.

A storage compartment module, such as storage compartment module 407, when added to a control station 401 and power is applied, provides information to the control station 401 identifying the storage compartment module 407, the number, location, and dimensions of each storage compartment of the storage compartment module and any other configuration or information necessary to enable the control station 401 to control the storage compartment module 407. It will be appreciated that any number, size and configuration of storage compartments of a storage compartment module may be utilized with the various implementations described herein.

In an alternative implementation, rather than providing all of the information from the storage compartment module to the control station 401, the storage compartment module 407 may only provide limited information, such as an identifier, to the control station 401. The control station 401, upon receiving the limited information from an added storage compartment module 407, may make a request to a remote computing system, such as the UAV management system, and obtain information about the configuration, number and sizes of the storage compartments of the added storage compartment module 407.

The control station 401, upon receiving identifying information of an added storage compartment module 407, may allocate the added capacity to the secure delivery location 400. In various implementations, the added storage compartment module may act as a slave component for the control station, receiving instructions (e.g., open storage compartment, open top doors of storage compartment module, move containers between storage compartments, close storage compartment, activate image capture device, monitor motion sensor) from the command component of the control station 401 and providing responses (e.g., closed-door, closed, open-door, object/movement detected, container moved) to the control station 401 via the storage compartment management component.

Each storage compartment of a storage compartment module 403, 405, 407, 409 or control station 401 includes upper, bottom, side and rear surfaces and at least one door configured to form a cavity in which items and/or containers may be positioned. For example, the upper surface and bottom surface of the storage compartment may be open so that a container may pass through the storage compartment. Likewise, gears 408 may be on the side surfaces to control the movement of containers 480 into and out of the storage compartment, secure the container in the storage compartment and/or charge a power module 482 included in the container 480. In some implementations, the storage compartments and/or the storage compartment module may be configured such that containers can be moved horizontally (side-to-side or front-to-back) so that other containers can move vertically within the storage compartment module. For example, in some implementations, containers may be received on the left side of a storage compartment module, be positioned within a storage compartment of the storage compartment module until the contained item is removed and then moved horizontally to the right side (or back) of the storage compartment module until the empty container is retrieved by a UAV, or another entity, and removed from the secure delivery location.

In addition, each storage compartment may include various security or other components. For example, looking at the expanded view of storage compartment 457, disposed within the cavity the storage compartment may include a locking mechanism 469, which may be controlled remotely by the command component of the control station 401 via the storage compartment management component. The locking component may be configured to secure the door 475 in a closed position. Likewise, the locking component may be configured to engage with the side 410 of the container 481 such that when the door 475 of the storage compartment 457 opens the side 410 of the container 480 also opens. The locking mechanism 469 may be controlled by the control station 401, either through wired or wireless communication with the storage compartment management component, to effect locking and unlocking of the door 475 of the storage compartment 457 and/or the container 480. For example, when a user interacts with the control station 401 via the display 413 and provides an access code or other identifier, the control station 401 may identify a specific storage compartment associated with the access code or other identifier and the command component may wirelessly send instructions to the storage compartment management component of the storage compartment module 407 to unlock a storage compartment 457. The instructions may include a command (e.g., unlock), an address or identifier of the specific storage compartment and any other information necessary for communication between the control station 401 and the storage compartment module 407. In response to receiving the instructions from the command component, the storage compartment management component of the storage compartment module 407 may activate a locking mechanism that moves the members of the locking mechanism 469 on the door 475 of the identified storage compartment 457 such that the members retract, thereby disengaging the lock of the storage compartment 457 allowing the door 475 to open. In some implementations, the storage compartment 457 may also include an interior latch and spring mechanism (not shown) such that when the locking mechanism 469 of the storage compartment 457 is disengaged the latch engages the side 410 of the container and the spring mechanism propels the door 475 of the storage compartment 457 and the side 410 of the container outward, thereby identifying to a user that the door 475 is unlocked and the storage compartment 457 is accessible.

While the locking mechanism described above utilizes retractable members and a latch, any mechanical, magnetic, electrical or other form of locking mechanism may be utilized with the various implementations described herein. In addition, the storage compartment 457 may also include magnets to help retrieve a door when it is not all the way closed. Also, the locking mechanism of different storage compartments and different storage compartment modules may be the same or different.

As containers are emptied by users retrieving delivered items, the control system 401 may reposition the containers so that containers with items are at a level easily accessible by users, while empty containers are higher in the storage compartment to facilitate retrieval and return of empty containers to the materials handling facility. For example, empty containers may be moved horizontally (side-to-side and/or front-to-back) within the storage compartment module so that other containers can be positioned within the storage compartment module.

Some storage compartments, such as any of the storage compartments and/or containers 480, may be refrigerated. In various implementations, such refrigerated storage compartments and/or containers may include their own cooling mechanisms or may rely on those of neighboring refrigerated storage compartments to which they are environmentally coupled, or alternatively each of the modules 401, 403, 405, 407, 409 or the entire secure delivery location 400 may have a centralized cooling system. The temperature of previously non-refrigerated storage compartments may be adjusted to become refrigerated storage compartments and vice-versa. The temperature in each of the refrigerated storage compartments and/or containers may be separately adjustable, such that items inside each of the refrigerated storage compartments and/or containers may be cooled to a desired temperature. For example, when a container positioned at one of the storage compartments is to be refrigerated, its temperature may be controlled by the control system 401. For example, the control system may provide cooling around the container thereby cooling the interior of the container. Alternatively, an access point may be available in the container to allow airflow into and/or out of the container to assist in cooling the container. In still another example, the container itself may have cooling capabilities and draw power from the container's power module to operate the cooling of the container. As noted above, the power module of the container may be charged by the secure storage location while the container is within the secure storage location 400.

In another example, the secure delivery location 400 may also include a storage compartment module configured as a drop-box (not shown). Rather than utilizing specific storage compartments of the secure delivery location 400 to store returned items and/or items for delivery, a storage compartment module configured as a drop-box may be utilized to securely store such items. For example, a drop-box may be configured with a pivoting door, lid or tray that allows items to be placed in the drop-box but not retrieved without having additional access to the drop-box. For example, a pivoting lid may be configured on the storage compartment so that a UAV can position itself over the storage compartment and disengage inventory and/or a container. The disengaged inventory and/or container will pass through the pivoting lid and into the drop-box. When a user arrives at the storage compartment, they may provide a personal identification number (PIN) or other identifier to gain access to the drop-box and retrieve the item.

The storage compartment modules 403, 405, 407, 409 as well as the control station 401 may also include self-leveling feet 479 that may be used to level the storage compartment modules 403, 405, 407, 409 and/or control station 401 when located on un-level surfaces. In addition, the self-leveling feet 479 may also be adjusted so that a storage compartment module, such as storage compartment module 405, 407, can be positioned so it is flush and aligned with a control station 401 or another storage compartment module. As an alternative to self-leveling feet 479, any other type of support mechanism may be utilized with various implementations described herein for supporting the control station 401 or any storage compartment module 403, 405, 407, 409. Also, the control station 401 and one or more of the storage compartment modules 403, 405, 407, 409 may utilize different types of support mechanisms. For example, the control station 401 may utilize self-leveling feet while the storage compartment modules 403, 405, 407, 409 may utilize rolling casters or wheels. The casters/wheels may further enable the ease with which storage compartment modules may be added or removed from a control station 401, thereby allowing the easy addition/removal of capacity at the secure delivery location 400.

In some implementations, the secure delivery location may be of a size to prevent interference between UAVs and humans. For example, a secure delivery location may be built so that it is taller than the average human or taller than the reach of an average human. In one implementation, the secure delivery location may be ten feet tall. In such an implementation, the storage compartments that are out of the reach of most humans may be utilized to store empty containers, parts for UAVs (e.g., batteries, propellers), computing components, UAVs, etc., and/or for use in repositioning containers within the secure delivery location.

As another example, portions of the secure delivery location that may receive or provide containers to UAVs or otherwise interact with UAVs may be separated from areas where humans may interact with the secure delivery location 400. For example, the secure delivery location 400 may be inside a facility or have a covering that extends out from a top of the secure delivery location. If the secure delivery location is inside a facility, the top of the secure delivery location 400 may extend through a roof of the facility or otherwise have external access that separates the top of the secure delivery location from humans. Likewise, a covering extending from the secure delivery location separates areas of the secure delivery location accessed by humans from areas in which a UAV may operate.

While the illustrated examples describe a UAV providing a container into a top of a secure delivery location 400, in other implementations, the container may be provided into a rear, side or front of the secure delivery location 400.

While the example discussed above, describes a secure delivery location that is capable of receiving multiple containers, in some implementations, the secure delivery location may be a simplified version that is configured for personal and/or family use (referred to herein as a personal secure delivery location). For example, a personal secure delivery location may be positioned at a person's home and include components similar to those of the secure delivery location discussed above. However, rather than having multiple storage compartments, it may be configured to only have an opening top and/or a reduced number of storage compartments. Like the secure delivery location discussed above, a personal secure delivery location may include, among other things, an opening top (to facilitate container delivery) that can be opened by an included computing system, a camera to monitor an arriving UAV, and an access panel to control user access to the personal secure delivery location. In such an implementation, when a UAV arrives at the personal secure delivery location, the computing system may cause the top door of the personal secure delivery location to open and guide the landing of the UAV and/or the disengagement of the container or item into the secure delivery location. The container and/or item may not be engaged by the personal secure delivery location (e.g., with gears) but may instead just come to rest inside the cavity of the personal secure delivery location. When disengagement of the item(s) or the container has been completed, the personal secure delivery location may cause the top door to close, thereby securing the item, and inform the user and/or the UAV management system that the item has been delivered. In some implementations, the personal secure delivery location may also provide charging to the UAV.

FIG. 5 depicts a block diagram of a UAV environment 500 that includes UAVs 200, secure delivery locations 400, relay locations 502, materials handling facilities 504 and remote computing resources 510, according to an implementation. Each of the UAVs 200, secure delivery locations 400, relay locations 502, materials handling facilities 504 and/or remote computing resources 510 may be configured to communicate with one another. For example, the UAVs 200 may be configured to form a wireless mesh network that utilizes Wi-Fi or another wireless means of communication, each UAV communicating with other UAVs within wireless range. In other implementations, the UAVs 200, UAV management system 526, materials handling facilities 504, relay locations 502 and/or the secure delivery locations 400 may utilize existing wireless networks (e.g., cellular, Wi-Fi, satellite) to facilitate communication. Likewise, the remote computing resources 510, materials handling facilities 504, secure delivery locations 400 and/or relay locations 502 may also be included in the wireless mesh network. In some implementations, one or more of the remote computing resources 510, materials handling facilities 504, secure delivery locations 400 and/or relay locations 502 may also communicate with each other via another network (wired and/or wireless), such as the Internet.

The remote computing resources 510 may form a portion of a network-accessible computing platform implemented as a computing infrastructure of processors, storage, software, data access, and other components that is maintained and accessible via a network, such as the mesh network and/or another wireless or wired network (e.g., the Internet). As illustrated, the remote computing resources 510 may include one or more servers, such as servers 520(1), 520(2), . . . , 520(N). These servers 520(1)-(N) may be arranged in any number of ways, such as server farms, stacks, and the like that are commonly used in data centers. Furthermore, the servers 520(1)-(N) may include one or more processors 522 and memory 524 which may store a UAV management system 526.

The UAV management system 526 may be configured, for example, to communicate with the secure delivery locations 400, UAVs 200, materials handling facilities 504, and/or relay locations 502. As an example, an access code may be synchronized between a control station 401 and the remote computing resources 510 so that the access code can be provided to a customer once the item has been delivered and used by the customer to retrieve the item.

When a message is sent to or from a UAV, the message may include an identifier for the UAV and each UAV may act as a node within the network, forwarding the message until it is received by the intended UAV. For example, the UAV management system 526 may send a message to UAV 200-6 by transmitting the message and the identifier of the intended receiving UAV to one or more of UAVs 200-1, 200-2, 200-3 that are in wireless communication with the UAV management system 526. Each receiving UAV will process the identifier to determine if it is the intended recipient and then forward the message to one or more other UAVs that are in communication with the UAV. For example, UAV 200-2 may forward the message and the identification of the intended receiving UAV to UAV 200-1, 200-3 and 200-5. In such an example, because 200-3 has already received and forwarded the message, it may discard the message without forwarding it again, thereby reducing load on the mesh network 500. The other UAVs, upon receiving the message, may determine that they are not the intended recipients and forward it on to other nodes. This process may continue until the message reaches the intended recipient.

In some implementations, if a UAV loses communication with other UAVs via the wireless mesh network, it may activate another wireless communication path to regain connection. For example, if a UAV cannot communicate with any other UAVs via the mesh network 500, it may activate a cellular and/or satellite communication path to obtain communication information from the UAV management system 526, materials handling facility 504, relay location 502 and/or a secure delivery location 400. If the UAV still cannot regain communication and/or if it does not include an alternative communication component, it may automatically and autonomously navigate toward a designated location (e.g., a nearby materials handling facility 504, relay location 502 and/or secure delivery location 400).

The wireless mesh network 500 may be used to provide communication between UAVs (e.g., to share weather information, location information, routing information, landing areas), UAV management system 526, materials handling facilities 504, secure delivery locations 400 and/or relay locations 502. Likewise, in some implementations, the wireless mesh network may be used to deliver content to other computing resources, such as personal computers, electronic book reading devices, audio players, mobile telephones, tablets, desktops, laptops, etc. For example, the mesh network may be used to deliver electronic book content to electronic book reading devices of customers. For example, one or more secure delivery locations 400, relay locations 502, materials handling facilities 504, the UAV management system 526, and/or UAVs may include a storage medium that contains digital content that may be provided to other computing devices.

Figure 6:
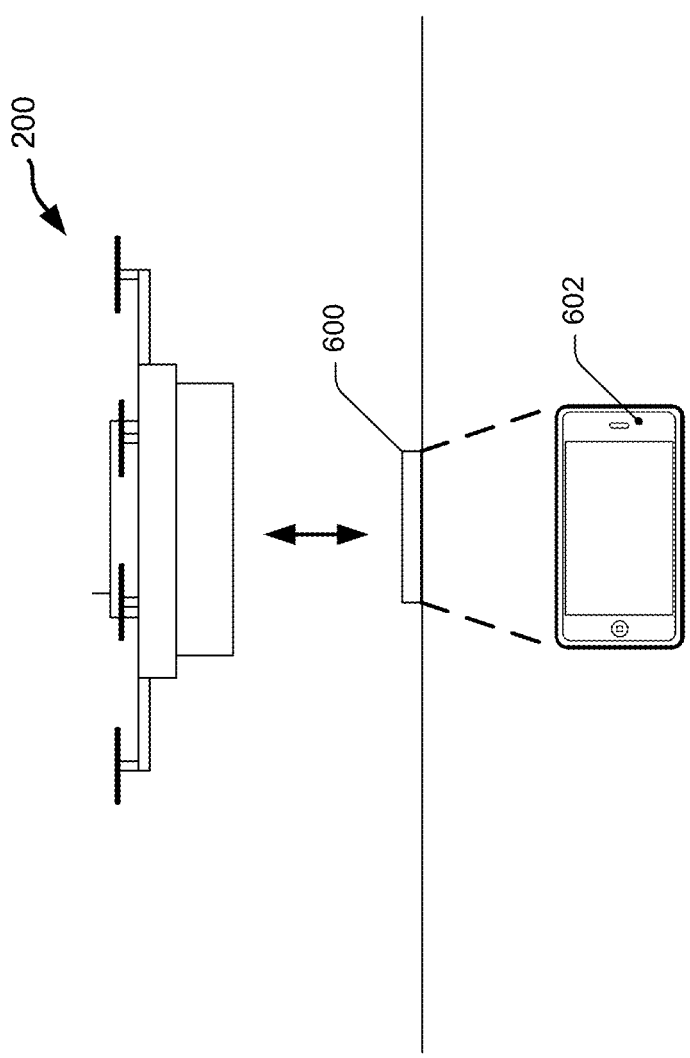
FIG. 6 depicts a block diagram of a UAV landing at an attended delivery location, according to an implementation.

FIG. 6 depicts a block diagram of a UAV 200 landing at an attended delivery location, according to an implementation. In this implementation, the remote entity controller is a portable device 600 of the user. For example, the remote entity controller may be an application executing on a user's portable device, such as a laptop, mobile phone, tablet, etc. In general, the portable device 600 may be any portable device 600 capable of executing a software program, communicating wirelessly with the UAV 200 (e.g., Wi-Fi, Bluetooth, Near Field Communication (NFC), cellular) and, in some embodiments, capable of capturing one or more images and/or video of the UAV using an image capture device 602, such as a camera.

In such an implementation, the user may be asked to position their portable device 600 with the camera facing upward on a surface where they would like to have the item delivered. For example, the user may place their phone on a table outside their house with the camera facing upward. As the UAV 200 approaches the delivery location, for example using GPS data, the remote entity controller sends a request to the UAV 200 to take control of the UAV for landing and disengagement of the inventory and/or container. The UAV 200 may provide control to the remote entity controller and receive commands from the remote entity controller. Once control has been established by the remote entity controller operating on the user's portable device 600, the input component 602 may capture one or more images of the UAV 200, determine position, altitude, speed, etc. of the UAV and provide instructions that are executed by the UAV to facilitate a safe landing. In some implementations, a series of instructions may be provided to the UAV by the remote entity controller to enable landing of the UAV. For example, the remote entity controller may capture one or more images of the UAV, determine and provide instructions to the UAV and the UAV may execute the instructions. During and after execution of the instructions, the remote entity controller may continue to monitor the UAV and provide additional instructions to the UAV. This process may continue until the UAV has landed or reached a determined height above the landing area.

In addition to the images, the UAV may provide information to the remote entity controller. For example, the UAV 200 may provide location, altitude, speed, weight, etc. to the remote entity controller. Likewise, the UAV 200 may monitor the surrounding environment to confirm that the landing area is safe and free of any humans or other animals. In some implementations, the remote entity controller may guide the UAV down directly above the device 600 and the inventory may be disengaged and come to rest on the device 600. In other implementations, the remote entity controller may navigate the UAV 200 to a safe landing area near the device 600 so that when the inventory and/or container are disengaged they come to rest near, but not on the device 600.

When the UAV 200 lands, or reaches a determined height over the landing area, the remote entity controller provides instructions to the UAV to disengage the inventory and/or the container, or to perform other actions. In alternative implementations, the remote entity controller, after landing the UAV 200 may return control to the UAV 200 and the UAV 200 may determine the action(s) to be performed.

While the above example describes an attended landing using a portable computing device 600 of the user, in other implementations, other devices may be used to assist and/or control the landing of the UAV 200. For example, a camera (e.g., web-cam) positioned inside the user's house or another location that is capable of obtaining images and/or video of the UAV 200 may be utilized.

In still other implementations, unattended landings may be performed by the UAV without assistance from a remote entity controller. For example, if the UAV has previously landed at a delivery location, the coordinates of the landing area may be utilized and the UAV may land at the same coordinates. In such an implementation one or more sensors of the UAV may be utilized to assist in the landing. For example, a time of flight sensor, radar, sonar, camera, infrared sensor, or other input component that is capable of determining the landing area configuration may be used by the UAV to guide the UAV to a safe landing.

In still another implementation, the landing and/or takeoff (or other operations) of the UAV may be manually performed or otherwise assisted by a user at the location and/or by a user at a remote location. For example, one or more images or other information obtained by the UAV and/or a remote entity controller (e.g., customer's phone) may be provided to a remote location where a user views the images and controls the landing of the UAV. In one implementation, the images and/or other information are provided over a wireless network, such as the wireless network discussed above with respect to FIG. 5, using a cellular network, etc., to a human operator that takes control of the UAV to perform the landing and/or takeoff of the UAV (or other operations). Control instructions may be provided from the human operator over the wireless network to control the UAV.

In still another example, the landing and/or takeoff (or other operations) may be semi-autonomous. For example, as a UAV prepares to land and/or takeoff, one or more images of the area surrounding the UAV or other information may be provided by the UAV to a user at a remote location and the user may provide an authorization before the UAV takes off or lands.

Figure 7:
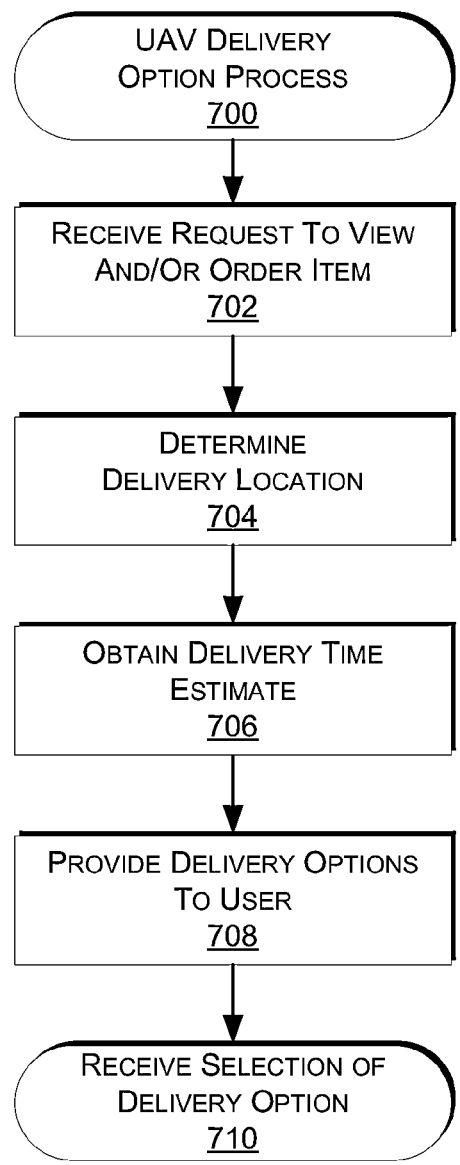
FIG. 7 is a flow diagram illustrating an example process for presenting an unmanned aerial vehicle delivery option for an item, according to an implementation.

FIG. 7 is a flow diagram illustrating an example process for presenting an unmanned aerial vehicle delivery option for an item, according to an implementation. This process, and each process described herein, may be implemented by the architectures described herein or by other architectures. The process is illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 700 begins by receiving a request to view and/or order an item for delivery, as in 702. For example, as discussed above with respect to FIG. 1, a user may request to view and/or order an item, such as an electronic device. In response to receiving a request to view and/or order an item for delivery, a delivery location is determined, as in 704. In some implementations, a delivery location may be a defined delivery location associated with a user account of a user that is accessing an e-commerce shopping site. In other implementations, the delivery location may be determined based on the current location of the user and/or a device associated with the user that requested to view and/or order the item. For example, if the user has identified their portable device as a device that can be used to determine the users current location, the position (e.g., GPS position) of the portable device may be determined by requesting that the portable device provide position information. In another implementation, the location of the device utilized by the user to request to view and/or order the item may be determined. For example, if the user requested to view and/or order the item using a device that includes a GPS receiver, the GPS coordinates of the device may be included in the request to view and/or order the item. Likewise, if the device is connected to a wireless network (e.g., Wi-Fi, cellular, satellite) the location of the device may be determined and used as the default location. For example, many Wi-Fi networks have been mapped and associated with specific locations. The Wi-Fi network may be identified and the corresponding location determined. In still another example, the user may identify their location.

Based on the determined delivery location, a delivery time estimate for automated aerial delivery is determined, as in 706. An example process for determining a delivery time estimate for automated aerial delivery is discussed below with respect to FIG. 8.

Upon determining the delivery time estimate, the example process 700 provides one or more delivery options to the user for selection, as in 708. For example, the user may be presented with an automated aerial delivery option, which could be as fast as 30 minutes or less, overnight delivery, ground delivery, etc. In response to providing one or more delivery options, the user may select a delivery option and order the item for delivery to a designated delivery location, as in 710.

Figure 8:
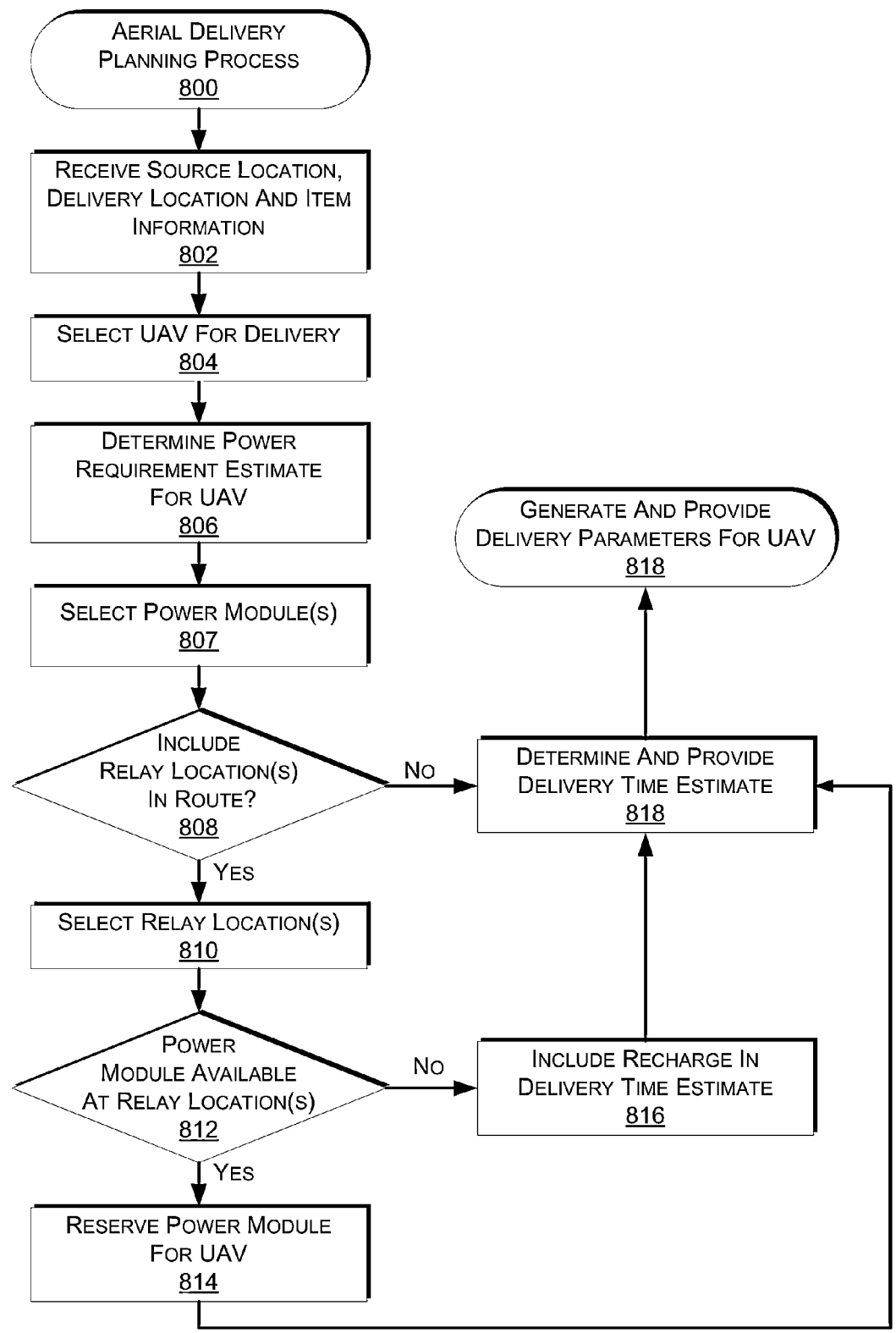
FIG. 8 is a flow diagram illustrating an example aerial delivery planning process, according to an implementation.

FIG. 8 is a flow diagram illustrating an example aerial delivery planning process 800, according to an implementation. The example process 800 begins receiving a source location, a delivery location and item information. As discussed above, the source location may be the location of the item or items that are to be retrieved by a UAV for delivery to a delivery location. For example, the source location may be a materials handling facility, a secure delivery location, a third party seller, or any other location from which an item may be retrieved for delivery. Likewise, the delivery location may be any location specified by a user for delivery of an item(s). Item information may include, among other things, an identification of the ordered item(s), the size, shape and/or weight of the ordered item(s), whether the item(s) is fragile, hazardous, etc.

Based on the provided information, a UAV is selected that will provide aerial delivery of the item(s), as in 804. Many factors may be considered in selecting a UAV for item delivery. For example, the size, shape and/or weight of the item(s) may be considered in determining the size and/or type of UAV that will be used to deliver the item(s) to the delivery location. Heavier items may require a larger UAV and/or one with a larger number of propellers and/or power module(s). Likewise, larger items may require a larger UAV to complete aerial item delivery. In addition to the size, shape and/or weight of the item, the available UAVs in the area where the item is to be retrieved and/or delivered may be considered. In other implementations, addition factors, such as optimizing for the use and/or distribution of the UAVs may be considered as a factor in selecting an available UAV. Once a UAV in the area where the item is to be retrieved and or delivered has been selected, a power requirement estimate for the selected UAV may be determined, as in 806. The power requirement estimate may be based on, for example, the weight of the UAV, the power consumption of the UAV, the weight of the item(s) to be delivered, the distance from the UAV to the source location, the distance from the source location to the destination location, the weather (higher winds may require additional power requirements), etc.

Based on the power requirements needed for the UAV to complete aerial item delivery, a power module is selected for the UAV, as in 807. For example, different power modules may be utilized depending on the determined power requirements needed. For example, smaller, lighter weight power modules that provide less power and/or power modules that are not fully charged may be utilized for delivers with lower power requirements (e.g., shorter deliveries and/or delivers of lighter items). In comparison, larger and/or multiple power modules may be utilized for deliveries with higher power requirements (e.g., longer deliveries and/or deliveries of heavier items).

In addition to selecting a power module(s), a determination may be made as to whether one or more relay locations are to be included in the route from the source location to the delivery location, as in 808. A relay location may be included if it is determined that the power requirement estimate exceeds the power available to the UAV. For example, a relay location may be added as a way point in the route so that the UAV can land at the relay location and either recharge or obtain different and/or additional power modules.

If it is determined that a relay location is to be included in the route, a relay location that is near or along the route from the source location to the delivery location is determined, as in 810. In addition to determining the relay location, a determination is made as to whether a power module that will provide sufficient power to the UAV is available at the relay location for use by the UAV, as in 812. For example, a relay location may include additional power modules that can be used to replace extinguished power modules of the UAV. If it is determined that a power module is available at the relay location, the power module is reserved for the UAV, as in 814. However, if it is determined that a power module is not available at the relay location, a recharge time may be added to the delivery time estimate, as in 816. For example, a time required to recharge the power module of the UAV to a sufficient level to allow delivery of the item(s) to the delivery location and transport of the UAV to another location may be determined and included in the delivery time estimate. In an alternative implementation, a different relay location may be selected.

After including a recharge time in the delivery time estimate, or if it is determined that the relay location is not to be included in the route between the source location and the delivery location, the delivery time estimate is determined and provided, as in 818. For example, the delivery time estimate may be provided to the user as part of the example process 700, discussed above with respect to FIG. 7. The delivery time estimate may include an estimate of the time required for the selected UAV to travel to the source location, retrieve the item, travel to the delivery location and disengage the item. Likewise, if the route includes a relay location, the time required for the UAV to travel to the relay location, switch power modules (or recharge) may be included in the delivery time estimate.

If the user has selected a delayed delivery time, the selected delivery time may be used as the delivery time estimate. For example, if it is determined that an item can be aerially delivered within thirty minutes, the user may have the option to select a delayed aerial delivery time that is longer than thirty minutes. In such an example, the UAV may delay the initiation of the delivery of the item until the delivery will result in the item being delivered at the requested delivery time. Likewise, in some implementations, the item may be partially delivered (e.g., to a relay location, secure delivery location) and remain there until it is retrieved by a UAV and delivered to the user selected delivery location at the requested delivery time.

In addition to determining the delivery time estimate, delivery parameters for the delivery of the item(s) may be generated and provided to the UAV. This may only be done when an item is ordered. The delivery parameters may include, among other information, the identity of the UAV that is to transport the ordered item(s) from the source location to the delivery location, the weight, size and/or shape of the item, the identification of the source location from which the item is to be retrieved, the destination location to where the item is to be delivered, etc.

While the example of FIG. 8 only refers to a single UAV transporting the item(s) from a source location to a delivery location, in some implementations, multiple UAVs may be involved in delivery of an item. For example, a first UAV may transport the item from a source location to a relay location. A second UAV may retrieve the item from the relay location and complete the delivery to the delivery location.

Figure 9:
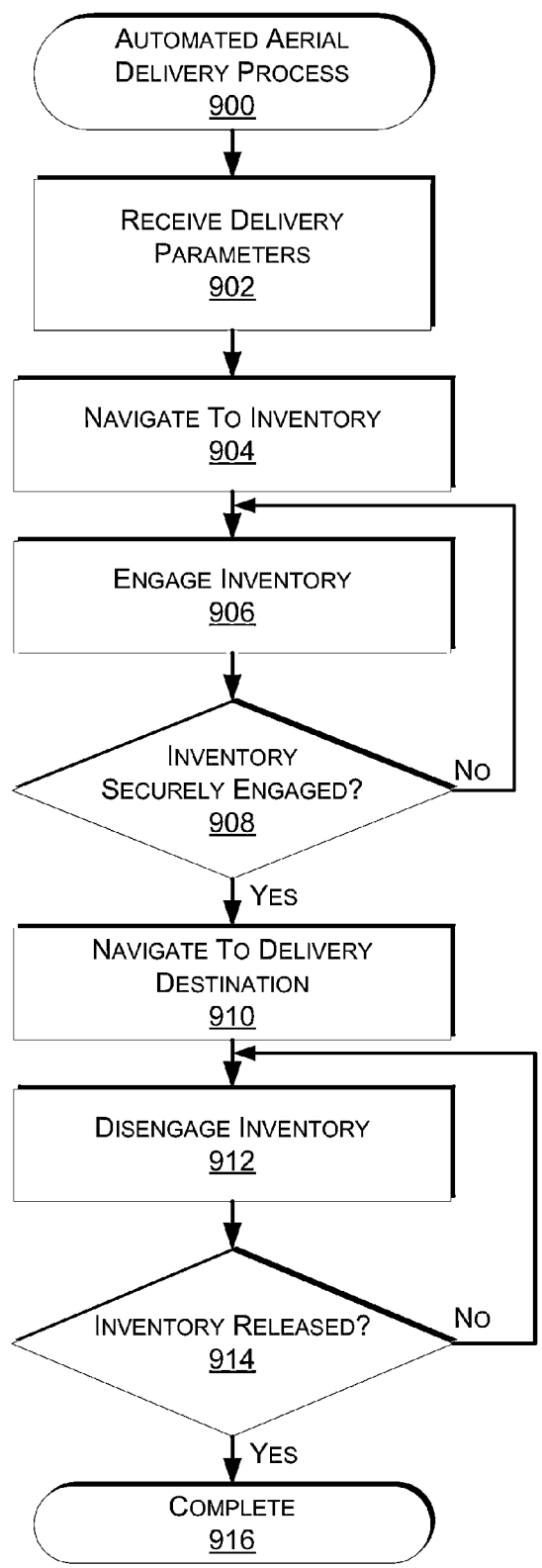
FIG. 9 is a flow diagram illustrating an example automated aerial delivery process, according to an implementation.

FIG. 9 is a flow diagram illustrating an example automated aerial delivery process 900, according to an implementation. The example process 900 begins by a UAV receiving inventory information and a delivery location, as in 902. Inventory information may include, for example, an identification of one or more items of inventory that are to be delivered to a delivery location, a location of the inventory, a location of a container that includes the inventory, etc. The delivery location may include location information for a delivery location for the inventory. For example, the delivery location may be identified by longitude and latitude information, GPS data, a physical address, etc.

Upon receiving inventory information and a delivery location, the UAV may autonomously navigate to the physical location of the inventory identified in the inventory information, as in 904. For example, the UAV may utilize its propellers and propeller motors to move aerially and a navigation system to navigate the UAV to the location of the inventory. Upon reaching the inventory location, the UAV may engage the inventory using the inventory engagement mechanism coupled to the UAV, as in 906. Upon engaging inventory, a determination may be made as to whether the inventory is securely engaged, as in 908. For example, one or more input devices on the UAV may be used to determine the position of the inventory in the inventory engagement mechanism. For example, the input device may be a camera, pressure sensor, etc. that can be used to determine the position of the inventory with respect to the inventory engagement mechanism.

If it is determined that the inventory is not securely engaged, the example process 900 returns to block 906 and continues until the inventory is securely engaged. If it is determined that the inventory is securely engaged, the example process 900 develops a navigation path from the current location to the delivery location. In some implementations, the navigation path may be provided to the UAV. In other implementations, the UAV may determine the navigation path. In still other implementations, the navigation path may be determined based on a combination of both provided information and navigation path determinations made by the UAV. In still other examples, multiple UAVs may communicate and share information, such as weather, dangerous areas, flight paths, etc., that may be used by the UAV to determine a navigation path.

Based on the determined navigation path, the UAV navigates to the delivery destination, as in 910. Upon reaching the delivery destination, the UAV identifies a fairly level surface with a clear path to which the UAV can navigate and disengage the inventory for final delivery. A level surface may be, for example, a table, the ground, a chair, a balcony, or the like. Upon identifying a level surface, the UAV positions itself over the level surface and lowers itself such that it is hovering just above the level surface. When the UAV reaches a desired position, the inventory is disengaged from the inventory engagement mechanism, as in 912. Upon disengagement, the inventory exits the inventory engagement mechanism and comes to rest on the level surface. A determination may be made as to whether the inventory has been fully released, as in 914. For example, the input devices on the UAV may be used to determine the position of the inventory on the level surface and/or to confirm that there is no longer any inventory in the inventory engagement mechanism. If it is determined that the inventory has not been fully released, the example process 900 returns to block 912 and continues until the inventory is released. Upon determining that the inventory has been released from the inventory engagement mechanism, the example process 900 completes, as in 916.

Figure 10:
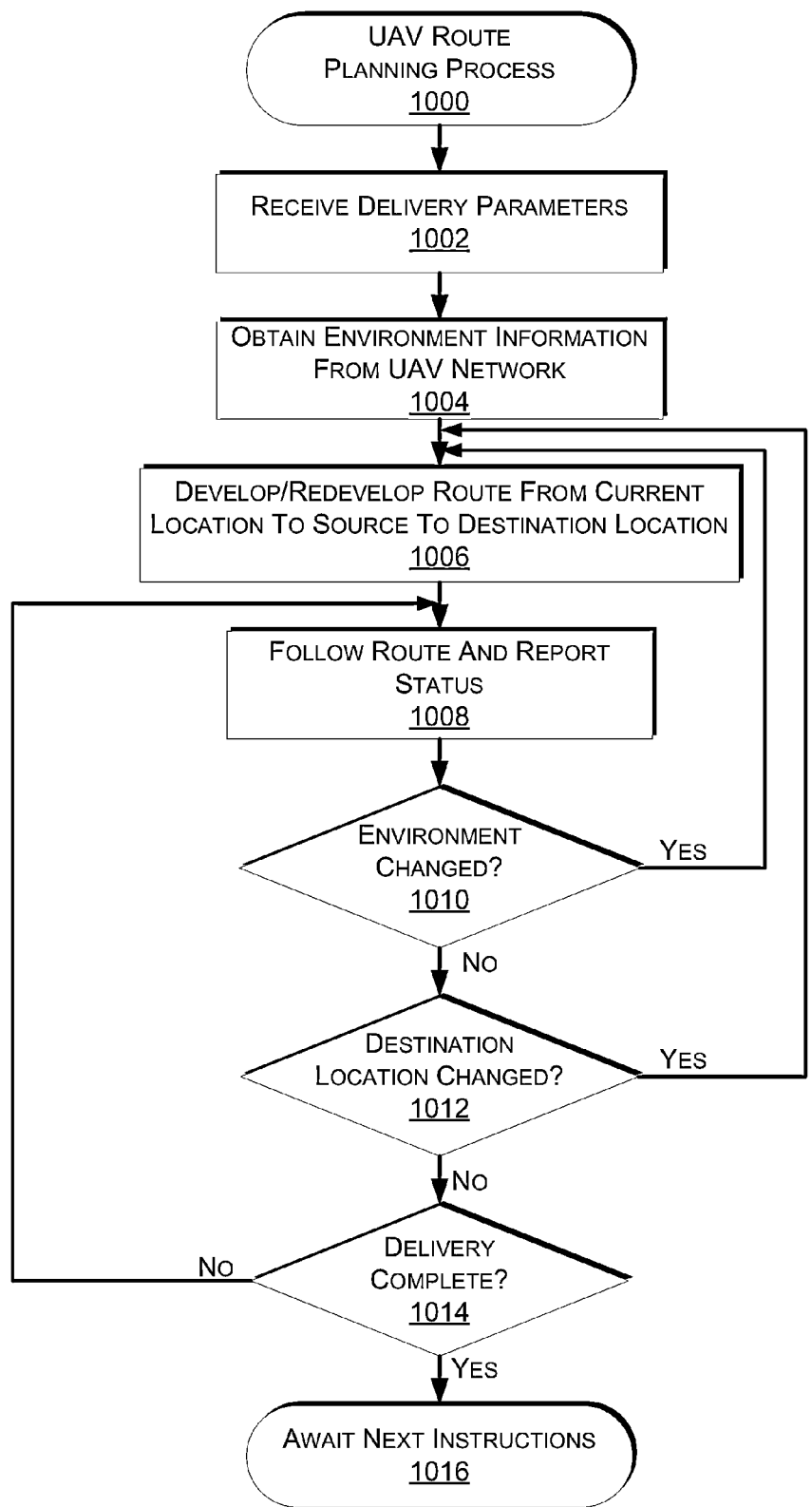
FIG. 10 is a flow diagram illustrating an example unmanned aerial vehicle route planning process, according to an implementation.

FIG. 10 is a flow diagram illustrating an example UAV route planning process 1000, according to an implementation. The example process 1000 begins by receiving the delivery parameters, such as those created as part of the example process 800, as in 1002. Based on the delivery parameters, relevant environment information may be obtained from the UAV mesh network, such as the mesh network discussed above with respect to FIG. 5, as in 1004. For example, information regarding the weather, traffic, dangerous areas, etc. along a general path between the source location and a delivery location may be obtained from the UAV network. Based on the delivery parameters and the environmental conditions obtained from the UAV network, a route from the current location of the UAV to the source location and from the source location to the delivery location is developed, as in 1006. For example, the UAV may be at a physical location that is separate from the source location and thus, may be required to navigate to the source location to retrieve the item that is to be delivered. For example, if a third party has sold an item that is to be delivered by a UAV, the location of the item sold by the third party may be the source location. In some implementations, the route may only include route information (e.g., directions from the current location to the source location and from the source location to the destination location). In other implementations, the route may also include altitude, speed and/or other information about the route.

Once the route is determined, the UAV may begin following the route, as in 1008. As discussed in further detail below with respect to FIG. 11, the specific navigation of the route may be determined by the UAV during traversal of the route. As the route is followed, the status of the UAV may be periodically reported to the UAV management system. For example, the position on the route, trajectory, speed, altitude, etc. may be periodically reported to the UAV management system.

As the UAV traverses the route, the UAV may be in constant or periodic communication with other UAVs, the UAV management system, materials handling facilities and/or relay locations, receiving and/or providing updates regarding the environment and/or other information. Based on received and/or collected information, a determination may be made as to whether one or more environmental conditions have changed, as in 1010. If it is determined that an environmental condition has changed, the example process 1000 returns to block 1006 and redevelops the route. However, if it is determined that the environment has not changed, the example process 1000 determines if the destination location has changed, as in 1012. As discussed above, the destination location may dynamically update based on the activities of the user to which the item(s) is being delivered. For example, if the user has selected that the item be delivered to their current location, the destination location may change if the user moves to a new location while the item is being delivered.

If it is determined that the destination location has changed, the example process 1000 returns to block 1006 and redevelops the route so that it terminates at the new delivery location. However, if it is determined that the delivery location has not changed, a determination is made as to whether the delivery of the item(s) has completed, as in 1014. If it is determined that the delivery has not completed, the example process 1000 returns to block 1008 and continues. If the delivery has been completed, the example process completes and the UAV awaits additional instructions. In some implementations, if additional instructions are not provided, the UAV may automatically begin traveling back to the nearest relay location and/or materials handling facility.

Figure 11:
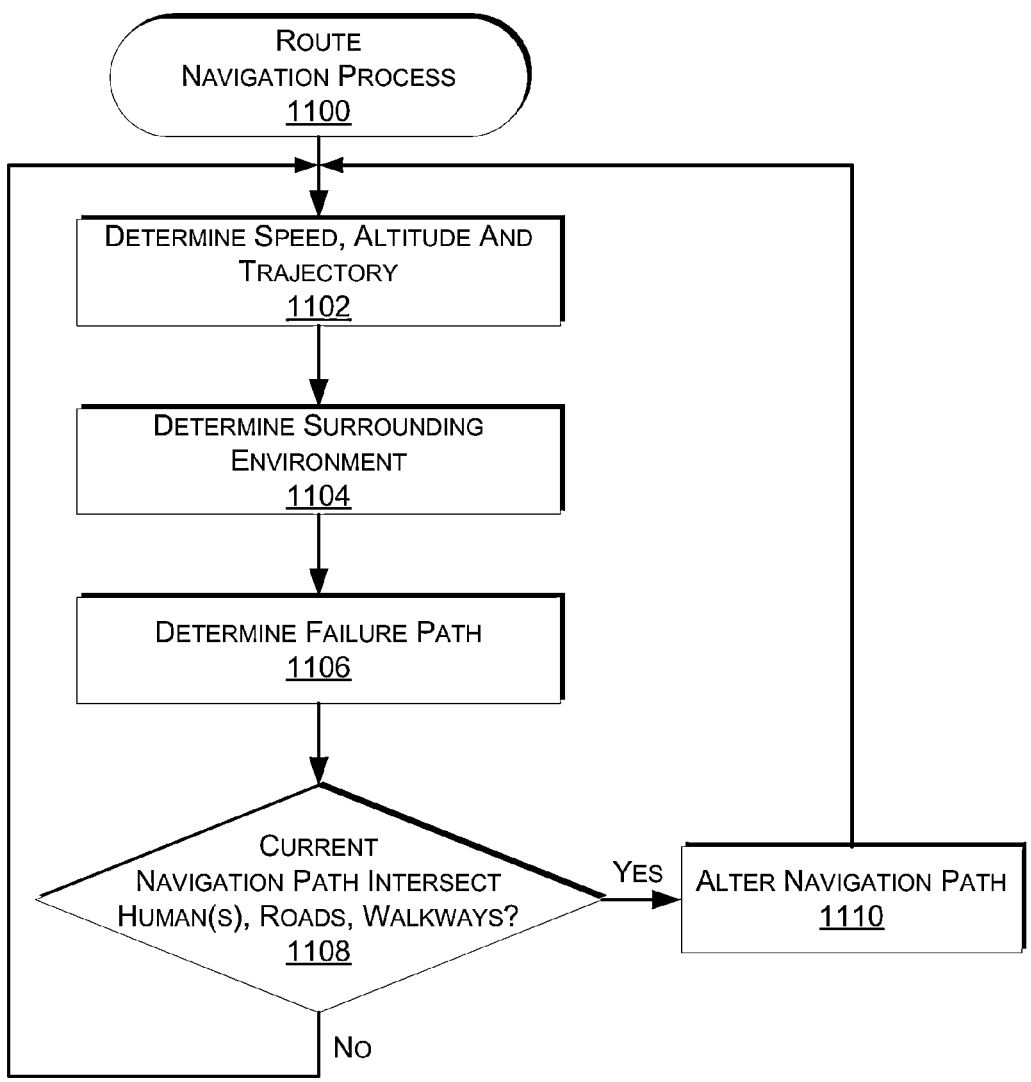
FIG. 11 is a flow diagram illustrating an example route navigation process, according to an implementation.

FIG. 11 is a flow diagram illustrating an example route navigation process 1100, according to an implementation. The example process may be performed by each UAV and be designed around a prime directive of causing no harm to humans or other animals. Generally, the UAV may navigate a route such that the UAV, even if it completely loses control and/or power will not cause harm to humans or other animals. For example, the navigation of a route may be developed such that even if the UAV loses power it will not collide with a human or other animal.

The example route navigation process 1100 begins by determining the current speed, altitude and/or trajectory of the UAV, as in 1102. Likewise, the surrounding environment of the UAV may be determined, as in 1104. For example, the UAV may utilize one or more inputs to determine the surrounding environment and/or receive information from other UAVs in the area. For example, time of flight sensors, sonar, cameras, etc. may be used to determine the surrounding environment. In other implementations, stored maps and/or information about the environment surrounding the UAV may be accessed. Based on the determined speed, altitude, trajectory and surrounding environment, a failure path is determined, as in 1106. A failure path may be the path the UAV would follow if all power and control of the UAV was lost. For example, based on the collected information, it may be determined where the UAV would land if all control and power were lost.

Based on the current path of the UAV and the determined failure path, a determination is made as to whether the current navigation path and/or failure path intersects with humans, other animals, roads, walkways and/or other areas that may be populated with humans and/or animals (e.g., houses, building, parks), as in 1108. If it is determined that the navigation path and/or failure path intersects with a human and/or other animals, roads, walkways, etc., the navigation path may be altered to avoid the humans, animals, roads, walkways, etc., as in 1110. In some implementations, the intersection can be completely avoided. In other implementations, potential interaction cannot be completely avoided. In such an instance, the navigation path will be altered to minimize any potential interaction. For example, if the navigation path intersects with a road, walkway or other human occupied path, the navigation path may be modified so that the intersection is limited (e.g., the UAV may cross the path at a perpendicular angle). As another example, the navigation path may be developed to minimize any potential human interaction. For example, if the navigation path requires that the UAV travel over and/or into a densely populated neighborhood, the navigation path will be modified such that if the UAV loses all power and control it will come to rest on a rooftop, in a tree, or another area that is not frequented by humans.

If it is determined that the current navigation path does not potentially intersect with humans and/or other animals, or if it has already been modified to reduce any such interaction, the example process 1100 returns to block 1102 and continues.

Figure 12:
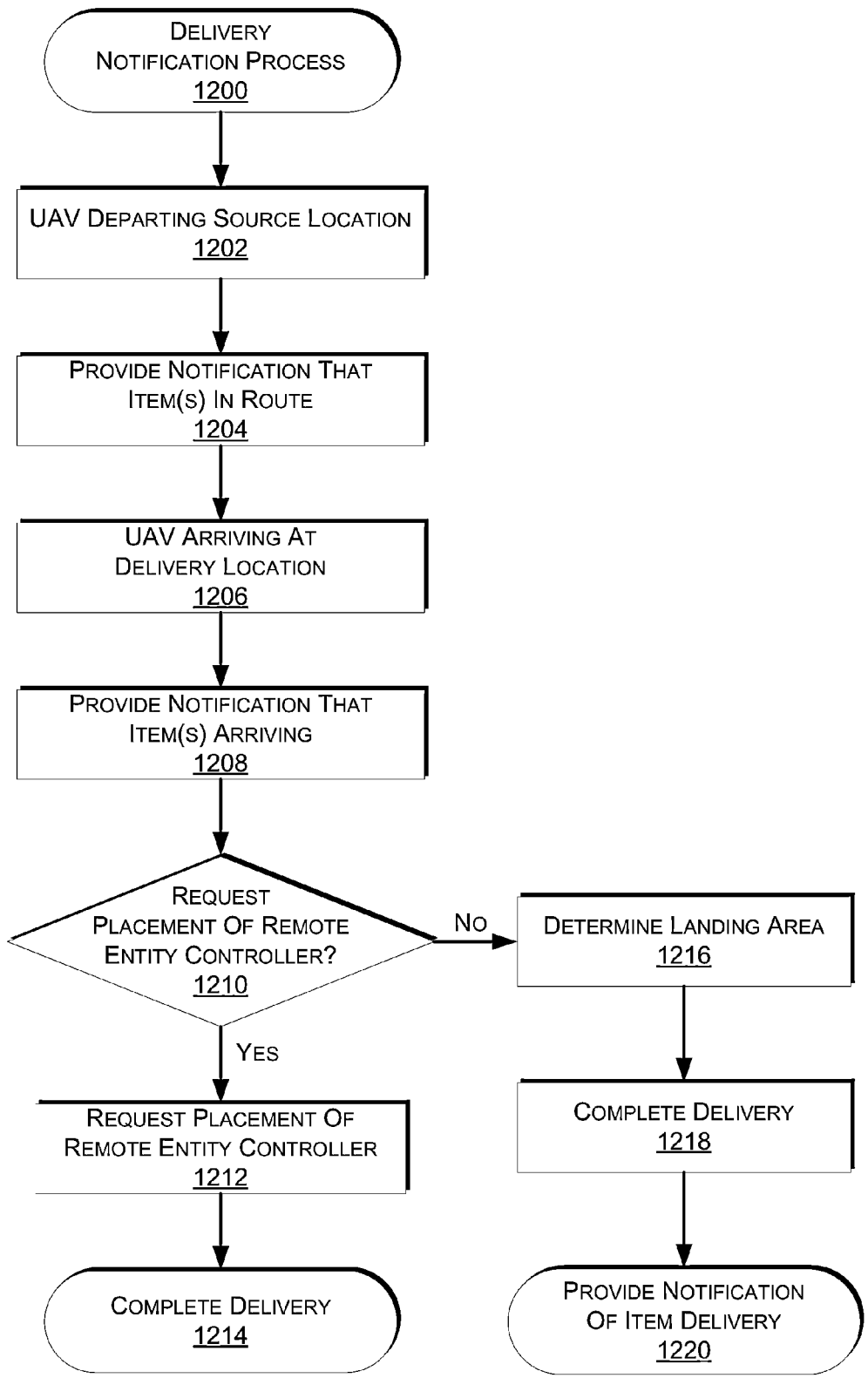
FIG. 12 is a flow diagram illustrating an example delivery notification process, according to an implementation.

FIG. 12 is a flow diagram illustrating an example delivery notification process 1200, according to an implementation. The example process 1200 begins when a UAV departs a source location with an item(s) that is to be delivered to a delivery location, as in 1202. When the UAV departs the source location with the item(s) to be delivered, a notification is provided to the user that ordered the item(s) and/or that is to receive the item(s), as in 1204. For example, the user may receive an email message, text message, instant message, phone call, or the like that notifies the user that the ordered item(s) has departed the source location and is in-route to the user selected delivery location. The message may also include an estimated delivery time.

Next, it is determined by the example delivery notification process 1200 that the UAV is arriving at the delivery location, as in 1206. For example, when the UAV is within a defined distance (e.g., 1 mile) of the delivery location, it may be determined that the UAV is arriving at the delivery location. Upon determining that the UAV is arriving at the delivery location, a notification may be provided to the user alerting them that the ordered item(s) will soon be arriving, as in 1208. As with the prior notification, the notification that the item will soon be arriving may be provided via email, text message, instant message, phone call, or the like.

In addition to determining that the item will soon arrive at the user selected delivery location, a determination may be made as to whether a request for placement of a remote entity controller is to be made, as in 1210. For example, if the delivery is an attended delivery to a user selected location where a delivery has not been previously made, it may be determined that a remote entity controller is to be placed at the delivery location. As discussed above with respect to FIG. 6, a remote entity controller may be, for example, a portable device of the user.

If it is determined that a request for placement of a remote entity controller is to be made, the request is provided to the user, as in 1212. After requesting placement of the remote entity controller, the delivery of the item is completed, as in 1214. If the remote entity controller is placed at the delivery location, the delivery may be completed by providing control of the UAV to the remote entity controller, as discussed above. If the remote entity controller is not placed at delivery location, or if it is determined that a request for placement of a remote entity controller is not to be made or is not needed, the example process 1200 may continue by determining a landing area for landing the UAV and delivering the item(s), as in 1216. For example, if an item has previously been delivered to the delivery location, stored landing area information may be obtained from the UAV management system and used to select a landing area for delivery of the item. Alternatively, the UAV may use one or more inputs to determine a location for delivery of the items. For example, the UAV may include and/or use a camera, sonar, time of flight sensor, radar, etc. to analyze the delivery location and select a landing area. Once the landing area has been selected, the delivery is completed, as in 1218. In addition, once delivery is completed, a notification may be provided to the user that ordered the item(s) and/or the user that is to receive the item(s) that the delivery of the item(s) has been completed, as in 1220.

Figure 13:
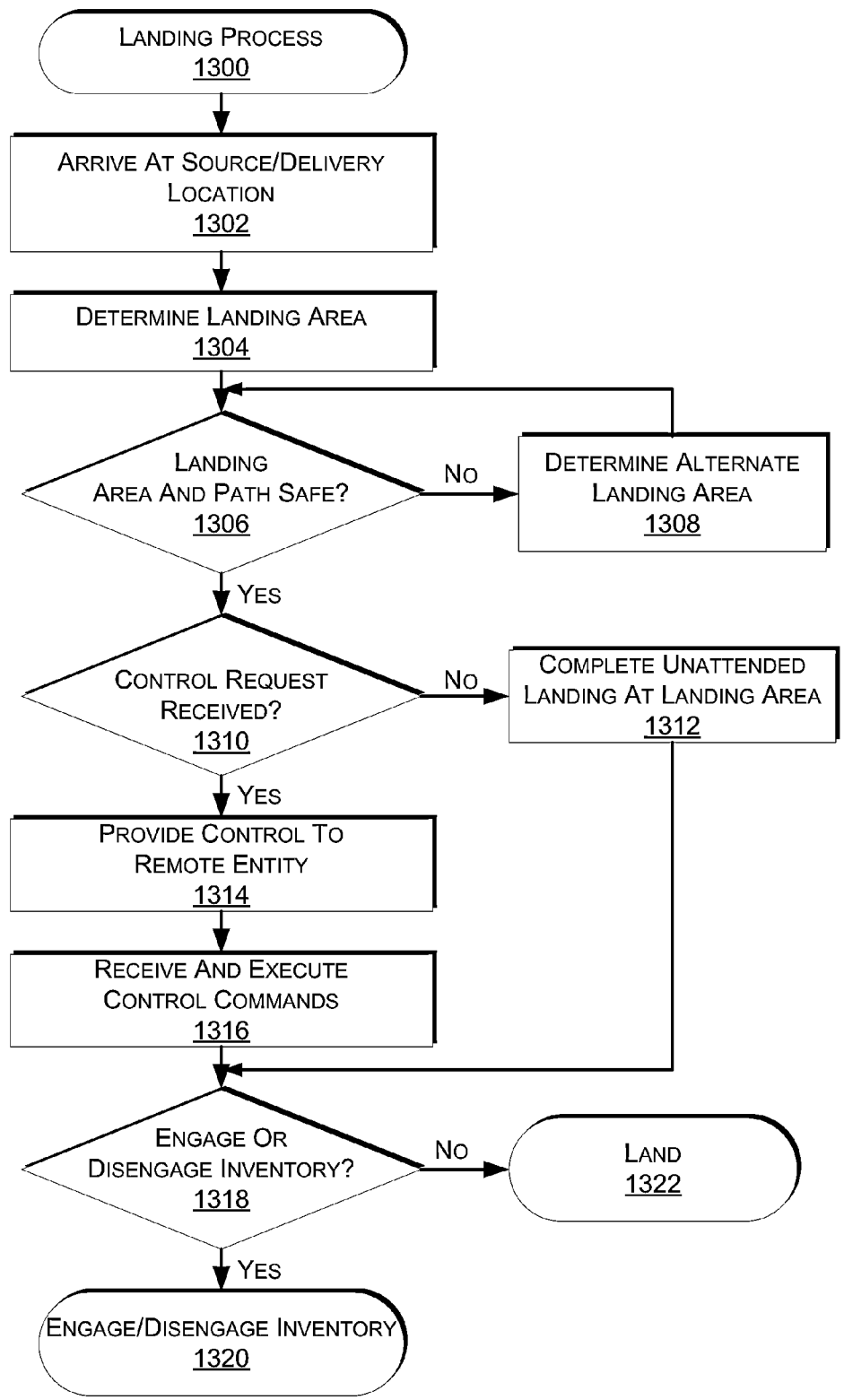
FIG. 13 is a flow diagram illustrating an example unmanned aerial vehicle landing process, according to an implementation.

FIG. 13 is a flow diagram illustrating an example UAV landing process 1300, according to an implementation. The example process 1300 begins when a UAV arrives at a source location, a delivery location and/or a relay location, as in 1302. As the UAV arrives at the location, a landing area is determined, as in 1304. As discussed above with respect to FIG. 12, the landing area may be determined based on a position of a remote entity controller, a prior landing at the area, etc.

In addition to determining the landing area, a determination may be made as to whether the landing area and the path between the UAV and the landing area are safe, as in 1306. For example, one or more inputs of the UAV and/or the remote entity controller may be used to obtain information (e.g., images) of the area. The obtained information may be processed to determine whether there are any humans, animals or other obstacles in the landing area and/or the path between the UAV and the landing area. Alternatively, or in addition thereto, the obtained information may be provided to a remote entity, such as a user or the UAV management system, and the remote entity may verify that the landing area is safe.

If it is determined that there are humans, animals or other obstacles, it may be determined that the landing area is not safe. If it is determined that the landing area is not safe, an alternate landing area at the delivery location is determined, as in 1308. Upon selecting an alternate landing area, the example process 1300 returns to decision block 1306 and continues.

If it is determined that the landing area and the path between the UAV and the landing area are safe, a determination is made as to whether a control request has been received by the UAV from a remote entity controller at the landing area, as in 1310. If it is determined that a control request has not been received, the UAV may complete an unattended landing at the delivery area, as in 1312. Alternatively, the UAV may not deliver the item. In another example, control of the UAV may be provided to a remote entity (e.g., a user or the UAV management system) and the remote entity may guide the UAV to the landing.

However, if it is determined that a control request has been received, control of the UAV is provided to the remote entity controller that requested control of the UAV, as in 1314. As discussed above, when control is provided to the remote entity controller, the remote entity controller may capture images or other information about the UAV and provide navigation instructions to the UAV to assist the UAV in landing at the landing area. Those instructions are received by the UAV and executed, as in 1316.

Once the UAV has landed or reached a desired height above the landing area, a determination is made as to whether to engage or disengage an item and/or container containing an item, as in 1318. For example, if the UAV is at a source location, it may be determined that the UAV is to engage an inventory item and/or a container that contains the inventory item. Engagement of items and containers is discussed above. Likewise, if the UAV already has an engaged inventory item(s) and/or a container, it may be determined that the UAV is to disengage the inventory item(s) or container. If it is determined that the UAV is to engage or disengage an inventory item(s) or a container, the UAV performs the determined action, as in 1320. However, if it is determined that the UAV is not to engage and/or disengage an item or container, the UAV may complete landing at the area, as in 1322. This may be done to recharge the UAV, so that repairs may be performed, to store the UAV, etc.

While the above examples have primarily discussed using the implementations for the aerial transport of inventory to a user, in other implementations, the UAVs may be configured for other purposes. For example, in some implementations, the UAVs may be configured to retrieve and/or transport other UAVs. In such an example, the UAV(s) being transported are the inventory. Likewise, in some implementations, the inventory transported may be power modules, empty containers, and the like. For example, a UAV may retrieve multiple power modules from a source location and transport those power modules to a delivery location (e.g., secure delivery location, a relay location) for use by other UAVs. When the UAV is at the delivery location it may retrieve one or more containers and transport those containers to another delivery location. In still other examples, UAVs may be used to transport inventory between materials handling facilities, between a third party merchant and a materials handling facility, etc.

Figure 14:
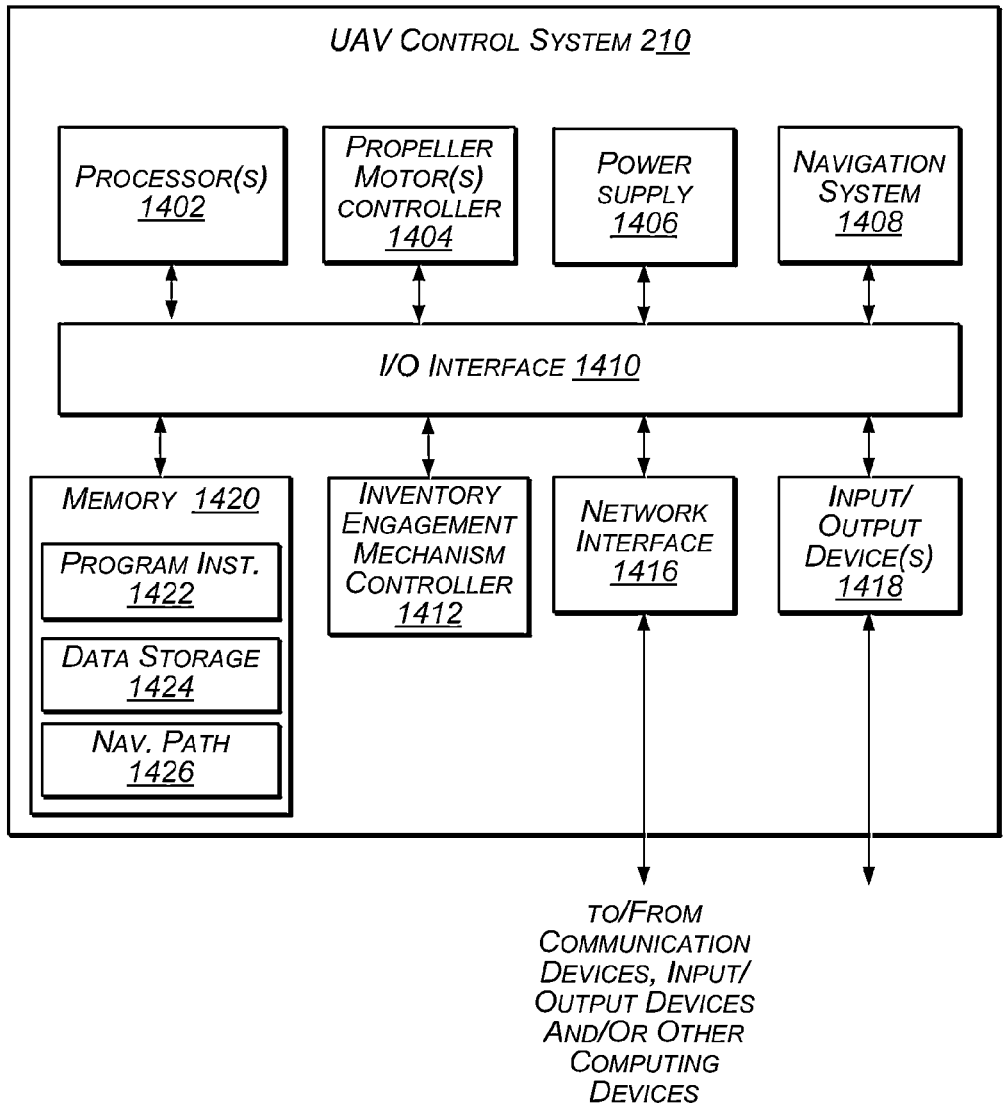
FIG. 14 is a block diagram illustrating various components of an unmanned aerial vehicle control system, according to an implementation.

FIG. 14 is a block diagram illustrating an example UAV control system 210 of the UAV 200. In various examples, the block diagram may be illustrative of one or more aspects of the UAV control system 210 that may be used to implement the various systems and methods discussed above. In the illustrated implementation, the UAV control system 210 includes one or more processors 1402, coupled to a non-transitory computer readable storage medium 1420 via an input/output (I/O) interface 1410. The UAV control system 210 may also include a propeller motor controller 1404, such as an electronic speed control (ESC), a power module 1406 and/or a navigation system 1408. The UAV control system 210 further includes an inventory engagement mechanism controller 1412, a network interface 1416, and one or more input/output devices 1418.

In various implementations, the UAV control system 210 may be a uniprocessor system including one processor 1402, or a multiprocessor system including several processors 1402 (e.g., two, four, eight, or another suitable number). The processor(s) 1402 may be any suitable processor capable of executing instructions. For example, in various implementations, the processor(s) 1402 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1402 may commonly, but not necessarily, implement the same ISA.

The non-transitory computer readable storage medium 1420 may be configured to store executable instructions, data, navigation paths and/or data items accessible by the processor(s) 1402. In various implementations, the non-transitory computer readable storage medium 1420 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1420 as program instructions 1422, data storage 1424 and navigation path data 1426, respectively. In other implementations, program instructions, data and/or navigation paths may be received, sent or stored upon different types of computer-accessible media, such as non-transitory media, or on similar media separate from the non-transitory computer readable storage medium 1420 or the UAV control system 210. Generally speaking, a non-transitory, computer readable storage medium may include storage media or memory media such as magnetic or optical media, e.g., disk or CD/DVD-ROM, coupled to the UAV control system 210 via the I/O interface 1410. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1416.

In one implementation, the I/O interface 1410 may be configured to coordinate I/O traffic between the processor(s) 1402, the non-transitory computer readable storage medium 1420, and any peripheral devices, the network interface 1410 or other peripheral interfaces, such as input/output devices 1418. In some implementations, the I/O interface 1410 may perform any necessary protocol, timing or other data transformations to convert data signals from one component (e.g., non-transitory computer readable storage medium 1420) into a format suitable for use by another component (e.g., processor(s) 1402). In some implementations, the I/O interface 1410 may include support for devices attached through various types of peripheral buses, such as a variant of the Peripheral Component Interconnect (PCI) bus standard or the Universal Serial Bus (USB) standard, for example. In some implementations, the function of the I/O interface 1410 may be split into two or more separate components, such as a north bridge and a south bridge, for example. Also, in some implementations, some or all of the functionality of the I/O interface 1410, such as an interface to the non-transitory computer readable storage medium 1420, may be incorporated directly into the processor(s) 1402.

The propeller motor(s) controller 1404 communicates with the navigation system 1408 and adjusts the power of each propeller motor to guide the UAV along a determined navigation path to a delivery location. The navigation system 1408 may include a GPS or other similar system than can be used to navigate the UAV to and/or from a delivery location. The inventory engagement mechanism controller 1412 communicates with the motor(s) (e.g., a servo motor) used to engage and/or disengage inventory. For example, when the UAV is positioned over a level surface at a delivery location, the inventory engagement mechanism controller 1412 may provide an instruction to a motor that controls the inventory engagement mechanism to release the inventory.

The network interface 1416 may be configured to allow data to be exchanged between the UAV control system 210, other devices attached to a network, such as other computer systems, and/or with UAV control systems of other UAVs. For example, the network interface 1416 may enable wireless communication between numerous UAVs that are transporting inventory to various delivery destinations. In various implementations, the network interface 1416 may support communication via wireless general data networks, such as a Wi-Fi network. For example, the network interface 1416 may support communication via telecommunications networks such as cellular communication networks, satellite networks, and the like.

Input/output devices 1418 may, in some implementations, include one or more displays, image capture devices, thermal sensors, infrared sensors, time of flight sensors, accelerometers, pressure sensors, weather sensors, etc. Multiple input/output devices 1418 may be present and controlled by the UAV control system 210. One or more of these sensors may be utilized to assist in the landing as well as avoid obstacles during delivery and/or engagement of inventory. For example, utilizing a location signal from the GPS receiver and one or more IR sensors, the UAV may safely land on a location designated by the user. The IR sensors may be used to provide real-time data to assist the UAV in avoiding moving/movable obstacles.

As shown in FIG. 14, the memory 1420 may include program instructions 1422 which may be configured to implement the example processes and/or sub-processes described above. The data storage 1424 may include various data stores for maintaining data items that may be provided for determining navigation paths, retrieving inventory, landing, identifying a level surface for disengaging inventory, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 210 is merely illustrative and is not intended to limit the scope of the present disclosure. The UAV control system 210 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 210 may be transmitted to the UAV control system 210 via transmission media or signals such as electrical, electromagnetic, or digital signals, conveyed via a communication medium such as a wireless network. Various implementations may further include receiving, sending or storing instructions and/or data implemented in accordance with the foregoing description upon a computer-accessible medium. Accordingly, the techniques described herein may be practiced with other UAV control system configurations.

Figure 15:
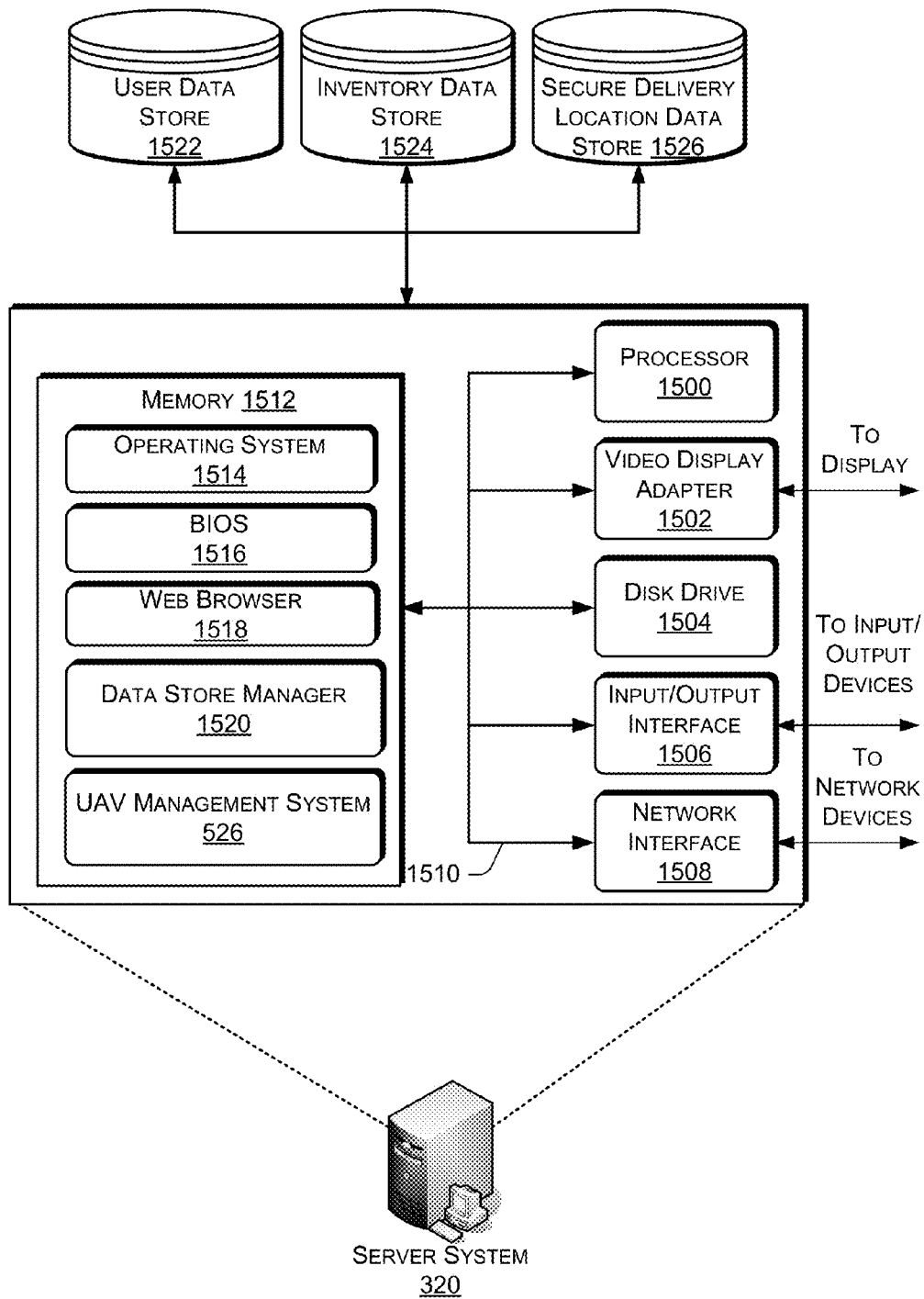
FIG. 15 is a block diagram of an illustrative implementation of a server system that may be used with various implementations.

FIG. 15 is a pictorial diagram of an illustrative implementation of a server system, such as the server system 520, that may be used in the implementations described herein. The server system 520 may include a processor 1500, such as one or more redundant processors, a video display adapter 1502, a disk drive 1504, an input/output interface 1506, a network interface 1508, and a memory 1512. The processor 1500, the video display adapter 1502, the disk drive 1504, the input/output interface 1506, the network interface 1508, and the memory 1512 may be communicatively coupled to each other by a communication bus 1510.

The video display adapter 1502 provides display signals to a local display (not shown in FIG. 15) permitting an operator of the server system 520 to monitor and configure operation of the server system 520. The input/output interface 1506 likewise communicates with external input/output devices not shown in FIG. 15, such as a mouse, keyboard, scanner, or other input and output devices that can be operated by an operator of the server system 520. The network interface 1508 includes hardware, software, or any combination thereof, to communicate with other computing devices. For example, the network interface 1508 may be configured to provide communications between the server system 520 and other computing devices, such as a UAV, materials handling facility, relay location and/or a secure delivery location, as shown in FIG. 5.

The memory 1512 generally comprises random access memory (RAM), read-only memory (ROM), flash memory, and/or other volatile or permanent memory. The memory 1512 is shown storing an operating system 1514 for controlling the operation of the server system 520. A binary input/output system (BIOS) 1516 for controlling the low-level operation of the server system 520 is also stored in the memory 1512.

The memory 1512 additionally stores program code and data for providing network services to the UAV management system 526. Accordingly, the memory 1512 may store a browser application 1518. The browser application 1518 comprises computer executable instructions that, when executed by the processor 1500, generate or otherwise obtain configurable markup documents such as Web pages. The browser application 1518 communicates with a data store manager application 1520 to facilitate data exchange between the inventory data store 1522, the user data store 1524, and/or secure delivery location data store 1526, and/or other data stores.

As used herein, the term "data store" refers to any device or combination of devices capable of storing, accessing and retrieving data, which may include any combination and number of data servers, databases, data storage devices and data storage media, in any standard, distributed or clustered environment. The server system 520 can include any appropriate hardware and software for integrating with the data stores 1522-1526 as needed to execute aspects of one or more applications for the UAV management system, UAVs, materials handling facilities, secure delivery locations, and/or relay locations The data stores 1522-1526 can include several separate data tables, databases or other data storage mechanisms and media for storing data relating to a particular aspect. For example, the data stores 1522-1526 illustrated include mechanisms for inventory information, container information, UAV information, user information, weather information, route information, source location information, delivery location information, etc., which can be used to generate and deliver information to the UAV management system 526, materials handling facilities, secure delivery locations, UAVs, relay locations, and/or users.

It should be understood that there can be many other aspects that may be stored in the data stores 1522-1526. The data stores 1522-1526 are operable, through logic associated therewith, to receive instructions from the server system 520 and obtain, update or otherwise process data in response thereto.

The memory 1512 may also include the UAV management system 526, discussed above. The UAV management system 526 may be executable by the processor 1500 to implement one or more of the functions of the server system 520. In one implementation, the UAV management system 526 may represent instructions embodied in one or more software programs stored in the memory 1512. In another implementation, the UAV management system 526 can represent hardware, software instructions, or a combination thereof.

The server system 520, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction in FIG. 15 should be taken as being illustrative in nature and not limiting to the scope of the disclosure.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system for aerial delivery of items comprising:
   a plurality of unmanned aerial vehicles, each of the plurality of unmanned aerial vehicles configured to aerially transport items;
   a management system, including:
      a processor; and
      a memory coupled to the processor and storing program instructions that when executed by the processor cause the processors to at least:
         receive from a device a request to order an item for aerial delivery, the item available for purchase through an e-commerce shopping site;
         determine a plurality of potential destination locations for delivery of the item, wherein at least one of the plurality of potential destination locations is determined based at least in part on a location of the device;
         receive a selection of a destination location from the plurality of potential destination locations; and
         send to an unmanned aerial vehicle of the plurality of unmanned aerial vehicles, delivery parameters identifying a source location that includes the item and the destination location;
   wherein the unmanned aerial vehicle, in response to receiving the delivery parameters, is further configured to at least:
      navigate to the source location;
      engage the item located at the source location;
      navigate a navigation route to the destination location; and
      disengage the item at the destination location.

2. The system of claim 1, wherein the unmanned aerial vehicle is further configured to:
   receive environment information from a second unmanned aerial vehicle; and
   develop the navigation route from the source location to the destination location based at least in part on the delivery parameters and the environment information.

3. The system of claim 1, wherein the destination location is at least one of a secure delivery location, a materials handling facility, a user designated delivery location, or a relay location.

4. The system of claim 1, wherein the program instructions that when executed by the processor further cause the processor to at least:
   determine, based at least in part on the request, a delivery time estimate identifying an estimated amount of time required to transport the item from the source location to the destination location.

5. The system of claim 1, wherein the program instructions that when executed by the processor further cause the processor to at least:
   update the destination location based at least in part on a current location of the device.

6. The system of claim 1, wherein the location of the device is determined based at least in part on one or more of Global Positioning System data received from the device, or an indication of a network through which the device is communicating.

7. A computer-implemented method, comprising:
under control of one or more computing systems configured with executable instructions,
receiving from a device a request to order an item for aerial delivery, the item available for purchase through an e-commerce shopping site;
determining, based at least in part on a location of the device, a destination location for delivery of the item;
selecting an unmanned aerial vehicle;
sending delivery parameters to the selected unmanned aerial vehicle; and
causing a delivery of the item from a source location to the destination location with the selected unmanned aerial vehicle.

8. The computer-implemented method of claim 7, wherein the delivery parameters include at least one of an identity of the unmanned aerial vehicle, a weight of the item, a size of the item, a shape of the item, an identification of the source location from which the item is to be retrieved, or the destination location.

9. The computer-implemented method of claim 7, wherein the unmanned aerial vehicle utilizes the delivery parameters to develop a route between the source location and the destination location for an autonomous delivery of the item.

10. The computer-implemented method of claim 7, further comprising:
estimating a power requirement for autonomously delivering the item based at least in part on one or more of the selected unmanned aerial vehicle, the destination location, the source location, a weight of the item, a size of the item, a distance between the source location and the destination location, weather between the source location and the destination location, a monetary value of the item, or the item.

11. The computer-implemented method of claim 10, further comprising:
determining that a power module of the unmanned aerial vehicle is to be replaced or recharged as part of the autonomous delivery of the item;
selecting a relay location at which the power module is to be replaced or recharged; and
wherein the delivery parameters identify the relay location.

12. The computer-implemented method of claim 7, wherein the destination location is further determined based at least in part on global positioning data of the device.

13. The computer-implemented method of claim 7, wherein the destination location is a secure delivery location configured to receive and store at least one item delivered by an unmanned aerial vehicle.

14. The computer-implemented method of claim 7, further comprising:
receiving a delivery notification from the unmanned aerial vehicle confirming that the item has been delivered to the destination location; and
sending to the device a notification indicating that the item has been delivered to the destination location.

15. The computer-implemented method of claim 7, further comprising:
determining, during aerial transport of the item by the selected unmanned aerial vehicle, that the delivery location has changed; and
causing the delivery destination to be updated such that the item is delivered by the selected unmanned aerial vehicle to the updated delivery location.

16. The computer-implemented method of claim 15, wherein:
the delivery location is a current location of the device; and
the delivery location is determined to change based at least in part on a movement of the device from a first location to a second location.

17. The computer-implemented method of claim 7, further comprising:
determining, based at least in part on the location of the device, an estimated delivery time for delivery of the item to the delivery location; and
providing to the device an indication of the estimated delivery time for delivery of the item to the delivery location.

18. A system for aerial transport of items using unmanned aerial vehicles, comprising:
a first system configured to at least:
receive from a device a request to order an item for aerial delivery, the item available for purchase through an e-commerce shopping site;
determine a plurality of potential destination locations for delivery of the item;
receive a selection of a destination location from the plurality of potential destination locations; and
determine a source location of the item;
a plurality of unmanned aerial vehicles, each of the unmanned aerial vehicles configured to at least:
wirelessly receive information from an unmanned aerial vehicle management system;
selectively engage and disengage inventory items; and
aerially navigate between a source location and the destination location along a navigation path; and
an aerial vehicle management system configured to wirelessly communicate with each of the plurality of unmanned aerial vehicles.

19. The system of claim 18, wherein each of the plurality of unmanned aerial vehicles are further configured to at least:
wirelessly communicate with a second unmanned aerial vehicle of the plurality of unmanned aerial vehicles.

20. The system of claim 18, wherein each of the plurality of unmanned aerial vehicles are further configured to at least:
determine the navigation path between the source location and the destination location; and
periodically update the navigation path during aerial navigation along the navigation path.

21. The system of claim 20, wherein the navigation path is determined based at least in part on one or more of delivery parameters provided by the aerial vehicle management system, environmental information, or information received from a second unmanned aerial vehicle.

22. The system of claim 18, wherein the plurality of unmanned aerial vehicles are further configured to:
form a wireless network; and
provide digital content to a device via the wireless network.

23. The system of claim 18, further comprising:
a secure delivery location configured to receive an item delivered by at least one of the unmanned aerial vehicles.

24. The system of claim 18, wherein the first system is further configured to at least:

determine a delivery estimate for aerial delivery of the item to the destination location; and provide to the device an indication of the delivery estimate.

\* \* \* \* \*